United States Patent
Matsui et al.

(10) Patent No.: US 9,423,598 B2
(45) Date of Patent: Aug. 23, 2016

(54) ZOOM LENS AND OPTICAL APPARATUS

(71) Applicant: SONY CORPORATION, Tokyo (JP)

(72) Inventors: Takumi Matsui, Tokyo (JP); Keita Kaifu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 26 days.

(21) Appl. No.: 14/611,398

(22) Filed: Feb. 2, 2015

(65) Prior Publication Data

US 2015/0226945 A1 Aug. 13, 2015

(30) Foreign Application Priority Data

Feb. 12, 2014 (JP) ................. 2014-024197

(51) Int. Cl.
  *G02B 15/14* (2006.01)
  *G02B 15/173* (2006.01)
  *G02B 27/64* (2006.01)

(52) U.S. Cl.
  CPC ........... *G02B 15/173* (2013.01); *G02B 27/646* (2013.01)

(58) Field of Classification Search
  CPC .. G02B 15/173; G02B 15/14; G02B 27/646; G02B 13/18; G02B 19/009
  USPC .................. 359/694–704, 811–830
  See application file for complete search history.

(56) References Cited

U.S. PATENT DOCUMENTS

| | | | | |
|---|---|---|---|---|
| 5,760,967 A | * | 6/1998 | Terasawa ............. | G02B 15/173 359/684 |
| 2013/0321655 A1 | * | 12/2013 | Abe ...................... | G02B 15/173 348/208.11 |

FOREIGN PATENT DOCUMENTS

| | | |
|---|---|---|
| JP | 2000-019398 A | 1/2000 |
| JP | 2012-093548 A | 5/2012 |

* cited by examiner

*Primary Examiner* — Mohammed Hasan
(74) *Attorney, Agent, or Firm* — Chip Law Group

(57) ABSTRACT

A zoom lens includes a first lens group having a positive refractive power, a second lens group having a negative refractive power, a third lens group having a positive refractive power, and a fourth lens group having a positive refractive power. The fourth lens group includes a first sub-lens group having a positive refractive power, a second sub-lens group having a negative refractive power, and a third sub-lens group. During zooming from a wide-angle end to a telephoto end, the first lens group and the first and third sub-lens groups are stationary in an optical axis direction relative to the image plane, the second and third lens groups move in the optical axis direction, and the second sub-lens group moves in the direction of the optical axis. During focusing from an infinite-distance object to a close-range object, the second sub-lens group moves in the optical axis direction.

18 Claims, 13 Drawing Sheets

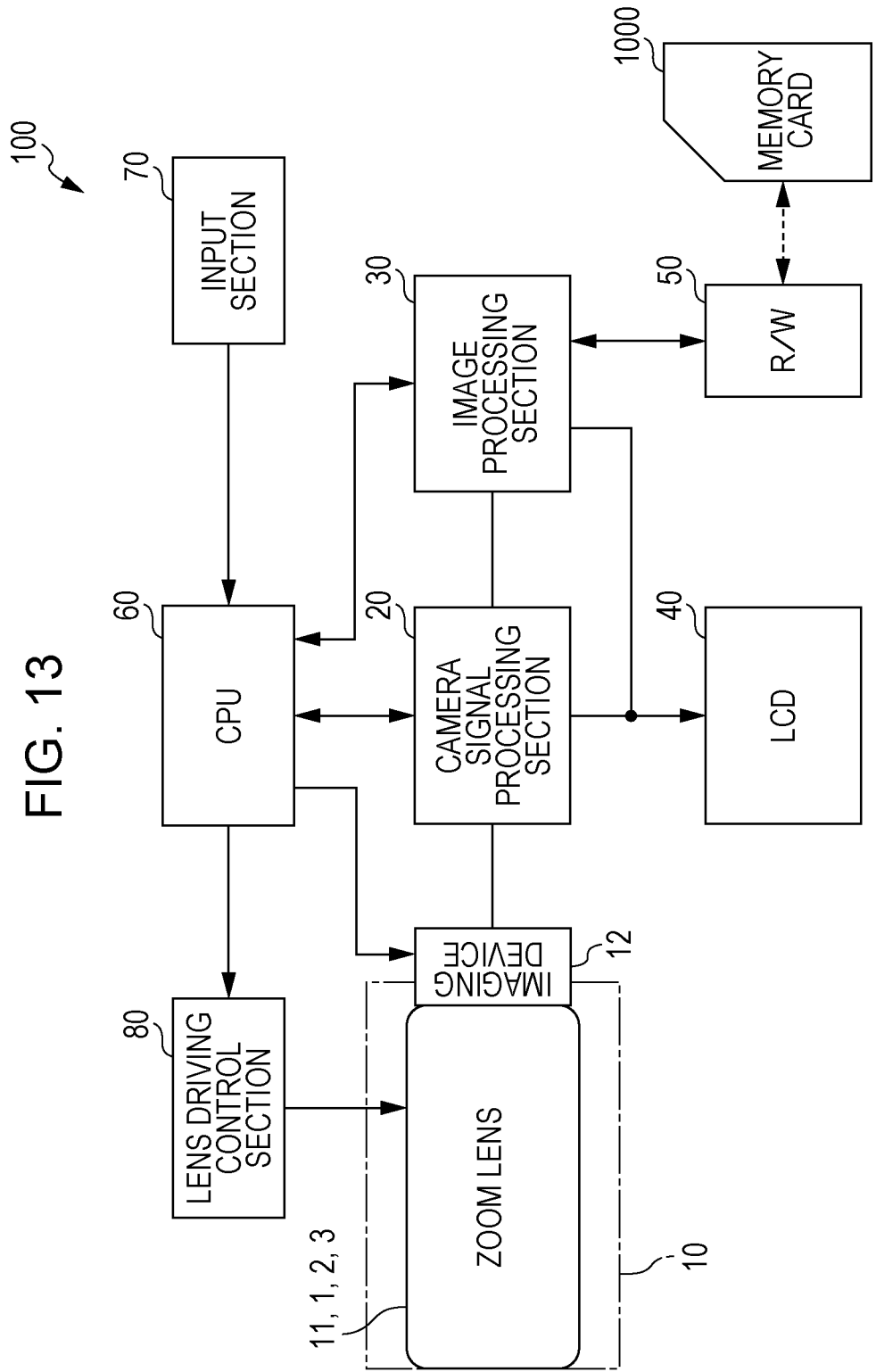

ZOOM LENS AND OPTICAL APPARATUS

CROSS REFERENCE TO RELATED APPLICATIONS

This application claims the benefit of Japanese Priority Patent Application JP 2014-024197 filed Feb. 12, 2014, the entire contents of which are incorporated herein by reference.

BACKGROUND

The present disclosure relates to a zoom lens, and an optical apparatus having the zoom lens. Specifically, the present disclosure relates to a small-sized internal-focus-type zoom lens, which is appropriate for a single-lens reflex camera, a non-reflex camera, a digital still camera, or the like, and an optical apparatus having the zoom lens.

As a telephoto-type zoom lens appropriate for a photographic camera, a digital still camera, a video camera, or the like, for example, in Japanese Unexamined Patent Application Publication Nos. 2012-93548 and 2000-19398, a zoom lens formed of four lens groups has been proposed.

SUMMARY

For example, in the telephoto-type zoom lens of which a focal length at the telephoto end is 180 mm or more based on 35-mm-version conversion and of which a zoom ratio is two times or more, it is preferable to reduce a length of a focusing lens group and a total length of the zoom lens.

However, in the zoom lenses described in Japanese Unexamined Patent Application Publication Nos. 2012-93548 and 2000-19398, the focusing lens group is in a first lens group. Thus, long stroke for focusing is necessary, and it is difficult to reduce the total length. Further, since the focusing lens group is in the first lens group, an aperture of the focusing lens group increases, and a weight thereof increases. As a result, it is difficult to achieve fast focusing.

According to the present disclosure, it is desirable to reduce the length of the focusing lens group and the total length, and it is desirable to provide a zoom lens capable of achieving an increase in the speed of focusing, and an optical apparatus having the zoom lens.

According to a first embodiment of the present disclosure, a zoom lens includes, in order from an object side: a first lens group that has a positive refractive power; a second lens group that has a negative refractive power; a third lens group that has a positive refractive power; and a fourth lens group that has a positive refractive power. The fourth lens group includes, in order from the object side, a first sub-lens group that has a positive refractive power, a second sub-lens group that has a negative refractive power, and a third sub-lens group. During zooming from a wide-angle end to a telephoto end, the first lens group, the first sub-lens group, and the third sub-lens group are stationary in a direction of an optical axis relative to the image plane, the second lens group and the third lens group move in the direction of the optical axis, and the second sub-lens group moves in the direction of the optical axis so as to decrease spacing between the first sub-lens group and the second sub-lens group. During focusing from an infinite-distance object to a close-range object, the second sub-lens group moves in the direction of the optical axis.

According to a second embodiment of the present disclosure, an optical apparatus includes the zoom lens according to the first embodiment of the present disclosure.

In the zoom lens or the optical apparatus according to the embodiments of the present disclosure, respective configurations of the first to fourth lens groups are optimized so as to reduce the length of the focusing lens group and the total length.

According to the zoom lens or the optical apparatus of the embodiments of the present disclosure, the respective configurations of the first to fourth lens groups are optimized so as to reduce the length of the focusing lens group and the total length. Therefore, it is possible to reduce the length of the focusing lens group and the total length. As a result, it is possible to increase the speed of focusing. In particular, the fourth lens group includes, in order from the object side, the first sub-lens group that has a positive refractive power, the second sub-lens group that has a negative refractive power, and the third sub-lens group, and the second sub-lens group is configured to perform focusing. Therefore, it is possible to reduce the length of the focusing lens group. As a result, it is possible to increase the speed of focusing.

It should be noted that the effect described herein is not necessarily limited, and may be any one of the effects described in the present disclosure.

BRIEF DESCRIPTION OF DRAWINGS

FIG. 13 is a block diagram illustrating one configuration example of the optical apparatus.

DETAILED DESCRIPTION OF EMBODIMENTS

Hereinafter, embodiments of the present disclosure will be described in detail with reference to the accompanying drawings. It should be noted that description will be given in the following order: 1. Basic Configuration of Lens; 2. Effects and Advantages; 3. Application Example for Optical Apparatus; 4. Numerical Examples of Lens; and 5. Other Embodiment.

1. Basic Configuration of Lens

Figure 1:
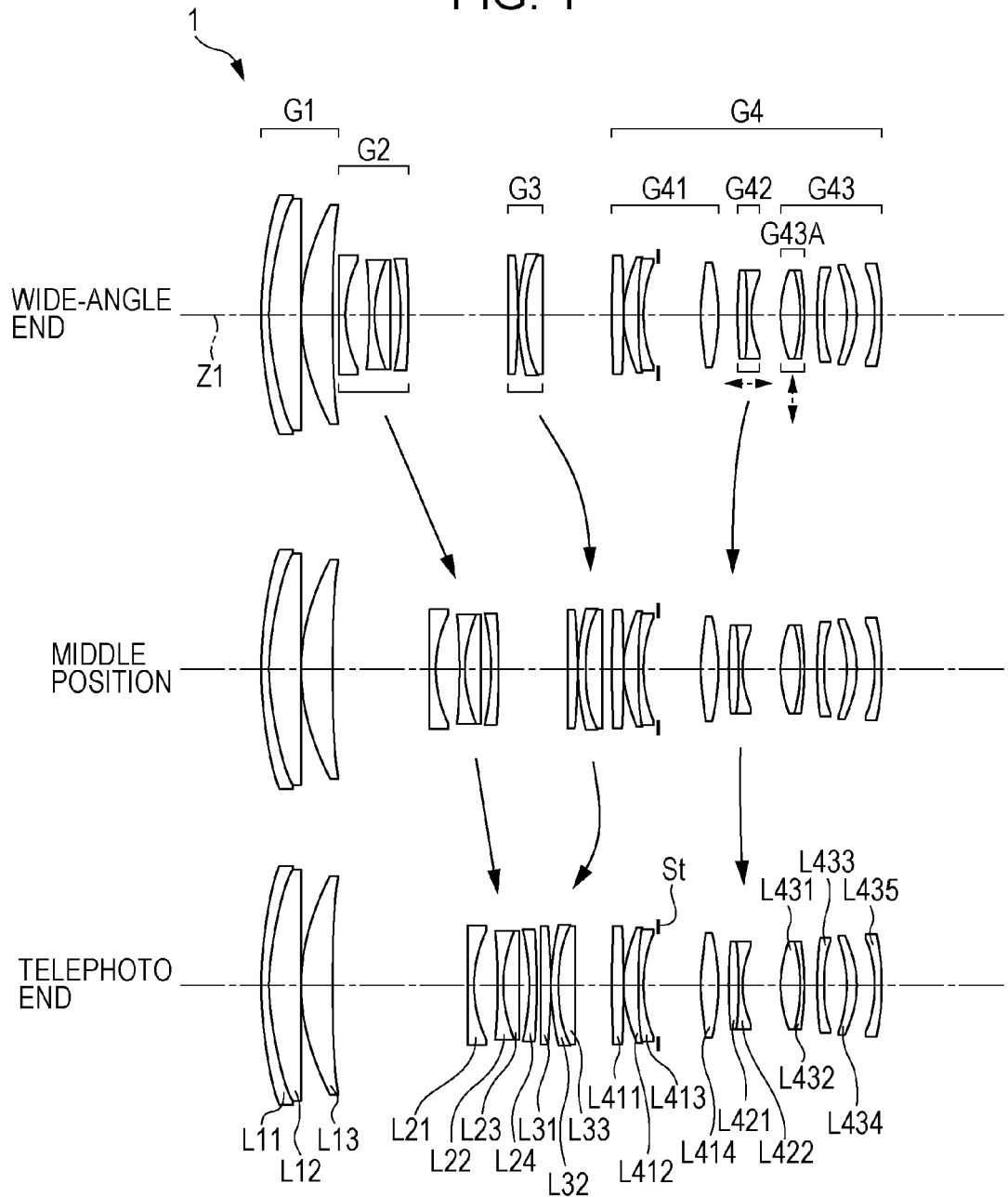
FIG. 1 is a lens cross-sectional view illustrating a first configuration example of a zoom lens according to an embodiment of the present disclosure.
Figure 2:
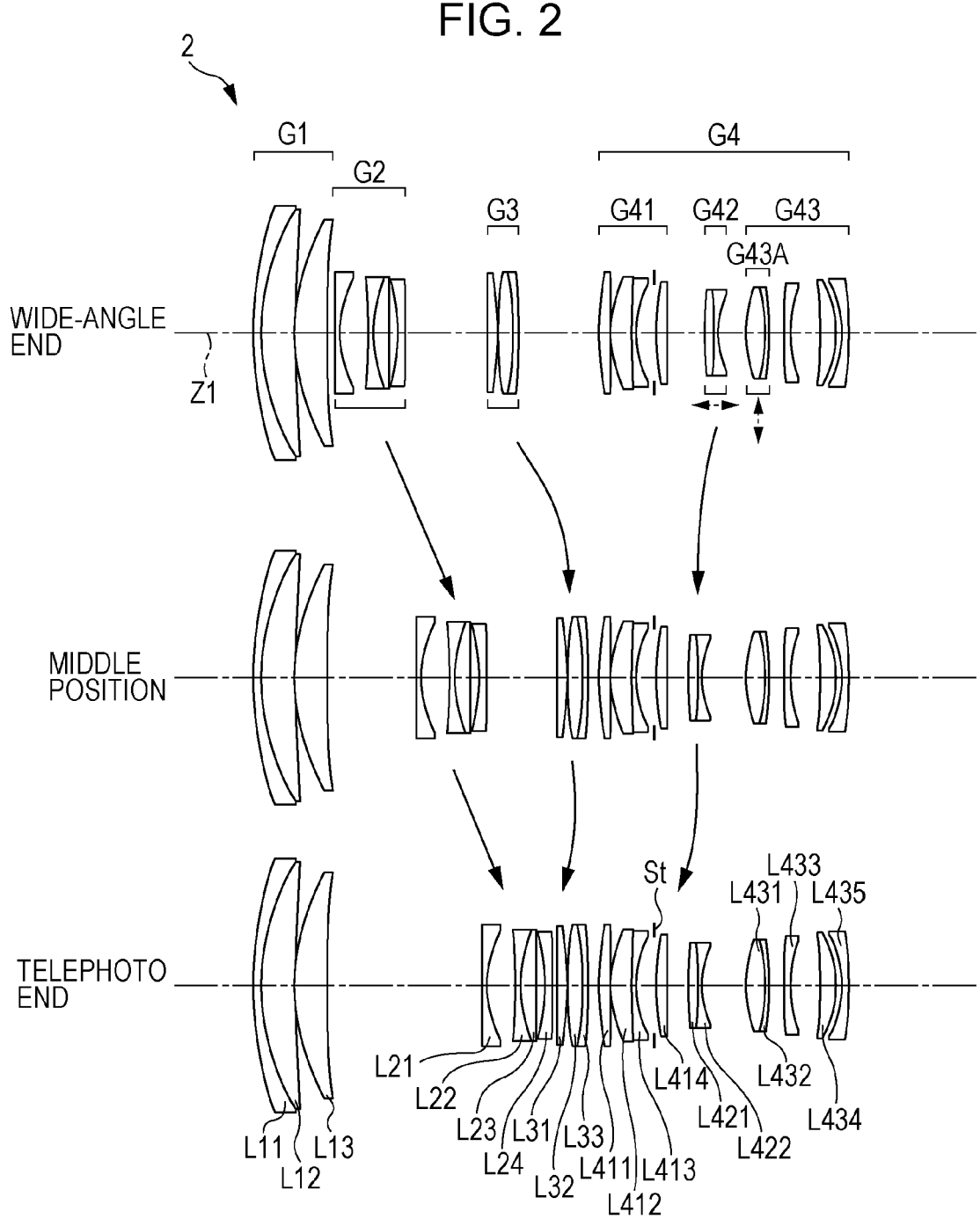
FIG. 2 is a lens cross-sectional view illustrating a second configuration example of the zoom lens.
Figure 3:
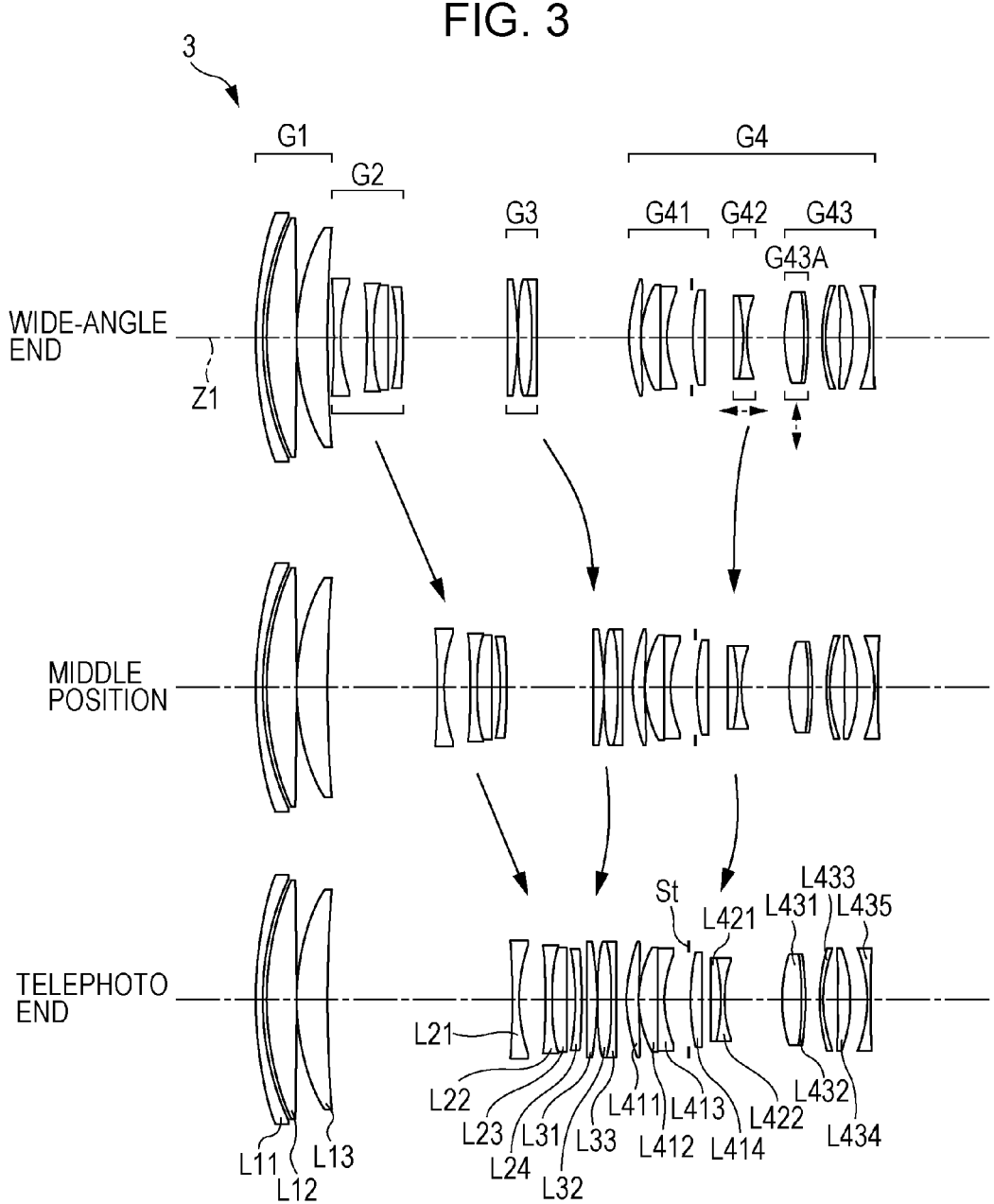
FIG. 3 is a lens cross-sectional view illustrating a third configuration example of the zoom lens.

FIG. 1 shows a first configuration example of a zoom lens according an embodiment of the present disclosure. FIG. 2 shows a second configuration example of the zoom lens. FIG. 3 shows a third configuration example of the zoom lens. Numerical examples, in which specific numerical values are applied to the configuration examples, will be described later. In FIG. 1 and the like, Z1 indicates the optical axis. Although not shown in the drawing, an optical member may be disposed between the zoom lens and an image plane. The optical member includes a seal glass for protecting an imaging device, various optical filters, and the like.

Hereinafter, a configuration of the zoom lens according to the present embodiment will be described appropriately with reference to the configuration examples shown in FIG. 1 and the like. However, the technology based on the present disclosure is not limited to the configuration examples shown in the drawings.

As shown in FIG. 1 and the like, the zoom lens according to the present embodiment is practically formed of four lens groups. In the zoom lens, in order from the object side along an optical axis Z1, a first lens group G1, a second lens group G2, a third lens group G3, and a fourth lens group G4 are arranged. The first lens group G1 has a positive refractive power. The second lens group G2 has a negative refractive power. The third lens group G3 has a positive refractive power. The fourth lens group G4 has a positive refractive power.

The fourth lens group G4 includes, in order from the object side, a fourth-1 lens group G41 (first sub-lens group) that has a positive refractive power, a fourth-2 lens group G42 (second sub-lens group) that has a negative refractive power, and a fourth-3 lens group G43 (third sub-lens group). It is preferable that the fourth-3 lens group G43 have a positive refractive power, but the fourth-3 lens group G43 may have a negative refractive power.

In each of FIGS. 1 to 3, the upper drawing shows positions of the lenses at the wide-angle end, the middle drawing shows positions of the lenses at the middle focal length, and the lower drawing shows positions of the lenses at the telephoto end. The solid arrows indicate movement loci during zooming. Thus, the lenses are present at the positions indicated by the arrows in accordance with zooming from the wide-angle end to the telephoto end. As shown in FIG. 1 and the like, in the zoom lens according to the present embodiment, during the zooming from the wide-angle end to the telephoto end, the first lens group, the fourth-1 lens group G41, and the fourth-3 lens group G43 are stationary in the direction of the optical axis relative to the image plane. In addition, the second lens group G2, the third lens group G3, and the fourth-2 lens group G42 move in the direction of the optical axis.

More specifically, during zooming from the wide-angle end to the telephoto end, the fourth-2 lens group G42 moves in the direction of the optical axis to reduce spacing between the fourth-1 lens group G41 and the fourth-2 lens group G42. Further, during zooming from the wide-angle end to the telephoto end, the second lens group G2 and the third lens group G3 move to increase spacing between the first lens group G1 and the second lens group G2, to decrease spacing between the second lens group G2 and the third lens group G3, and to change spacing between the third lens group G3 and the fourth lens group G4, in the direction of the optical axis.

The zoom lens according to the present embodiment is a so-called internal-focus-type zoom lens in which at least the fourth-2 lens group G42 moves during focusing from the infinite-distance object to the close-range object. In addition, not only the fourth-2 lens group G42 but also a part or the entirety of the first lens group G1 may additionally move as a focusing lens group. Alternatively, a part or the entirety of the third lens group G3 may additionally move as a focusing lens group.

Besides, it is preferable that the zoom lens according to the present embodiment satisfy the following predetermined conditional expressions and the like.

2. Effects and Advantages

Next, effects and advantages of the zoom lens according to the present embodiment will be described. In addition, preferred configurations of the zoom lens according to the present embodiment will be described.

It should be noted that the effects described in the present specification are just examples and are not limited to this. Further, the present technology may have other effects.

In the zoom lens according to the present embodiment, by moving the fourth-2 lens group G42 having a negative refractive power as a second sub-lens group in the fourth lens group G4, the focal length of the fourth lens group G4 as a main imaging lens group can be changed. As a result, it is possible to obtain a zoom lens of which the total optical length is short. Further, by performing focusing from an infinite-distance object to a close-range object through movement of the fourth-2 lens group G42, it is possible to reduce the size of the focusing lens group. Accordingly, it is possible to increase the speed of focusing.

It is preferable that the zoom lens according to the present embodiment satisfy the following Conditional Expression (1).

$$0.5 < OL4/F4T < 1.1 \qquad (1)$$

where

OL4 is a distance on the optical axis from a vertex of a lens surface of the fourth lens group G4, which is positioned to be closest to an object side, to the image plane, and F4T is a focal length of the fourth lens group G4 at the telephoto end.

Conditional Expression (1) defines the distance on the optical axis from the vertex of the lens surface of the fourth lens group G4, which is positioned to be closest to the object side, to the image plane. By satisfying Conditional Expression (1), it is possible to appropriately correct various aberrations which are caused by the fourth lens group G4 while keeping the distance from the fourth lens group G4 to the image plane short. If the result of Conditional Expression (1) is greater than the upper limit thereof, relative to the focal length of the fourth lens group G4 at the telephoto end, the distance from the fourth lens group G4 to the image plane excessively increases. As a result, it is difficult to decrease the total optical length of the zoom lens. If the result of Conditional Expression (1) is less than the lower limit thereof, the distance from the fourth lens group G4 to the image plane excessively decreases. As a result, it is difficult to correct mainly spherical aberration, comatic aberration, and curvature of field.

In addition, in order to ensure the effect, it is more preferable that a numerical value range of Conditional Expression (1) be set as a range of the following Conditional Expression (1)'.

$$0.6 < OL4/F4T < 1.0 \quad (1)'$$

Further, it is preferable that the zoom lens according to the present embodiment satisfy the following conditional expression (2).

$$1.0 < F4W/FW < 3.0 \quad (2)$$

where

F4W is a focal length of the fourth lens group G4 at the wide-angle end, and

FW is a focal length of the whole system at the wide-angle end.

Conditional Expression (2) defines an appropriate range of the focal length of the fourth lens group G4 at the wide-angle end. By satisfying Conditional Expression (2), it is possible to appropriately define the focal length of the fourth lens group G4 as a main imaging lens group in the zoom lens. Thereby, it is possible to appropriately define an amount of zoom of a main zooming section that is formed of the first lens group G1, the second lens group G2, and the third lens group G3. If the result of Conditional Expression (2) is greater than the upper limit thereof, the focal length of the fourth lens group G4 excessively increases. Hence, the total optical length of the fourth lens group G4 increases. As a result, it is difficult to decrease the total optical length of the zoom lens. In contrast, if the result of Conditional Expression (2) is less than the lower limit thereof, it is necessary to increase a magnification ratio of the main zooming section formed of the first lens group G1, the second lens group G2, and the third lens group G3. As a result, it is difficult to correct spherical aberration and chromatic aberration at the telephoto end.

In addition, in order to ensure the effect, it is more preferable that a numerical value range of Conditional Expression (2) be set as a range of the following Conditional Expression (2)'.

$$1.2 < F4W/FW < 2.4 \quad (2)'$$

Further, it is preferable that the zoom lens according to the present embodiment satisfy the following conditional expression (3).

$$1.0 < F4T/F4W < 1.4 \quad (3)$$

Conditional Expression (3) defines an appropriate range of a ratio of the focal length of the fourth lens group G4 at the telephoto end to the focal length thereof at the wide-angle end. By satisfying Conditional Expression (3), it is possible to appropriately define an amount of zoom in the fourth lens group G4. If the result of Conditional Expression (3) is greater than the upper limit thereof, the amount of zoom in the fourth lens group G4 excessively increases. As a result, it is difficult to suppress fluctuation in aberrations during zooming. In contrast, if the result of Conditional Expression (3) is less than the lower limit thereof, there is no contribution of the fourth lens group G4 to zooming. As a result, it is difficult to decrease the total optical length of the zoom lens.

In addition, in order to ensure the effect, it is more preferable that a numerical value range of Conditional Expression (3) be set as a range of the following Conditional Expression (3)'.

$$1.05 < F4T/F4W < 1.3 \quad (3)'$$

Further, it is preferable that the zoom lens according to the present embodiment satisfy the following conditional expression (4).

$$0.35 < F41/F4T < 0.6 \quad (4)$$

where

F41 is a focal length of the first sub-lens group (fourth-1 lens group G41), and F4T is a focal length of the fourth lens group G4 at the telephoto end.

Conditional Expression (4) defines an appropriate range of a ratio of the focal length of the fourth-1 lens group G41 as the first sub-lens group to the focal length of the fourth lens group G4 at the telephoto end. By satisfying Conditional Expression (4), it is possible to define an appropriate range of a refractive power of the fourth-1 lens group G41 which is a main imaging group in the fourth lens group G4. As a result, it is possible to prevent mainly spherical aberration, comatic aberration, and curvature of field from occurring.

In addition, in order to ensure the effect, it is more preferable that a numerical value range of Conditional Expression (4) be set as a range of the following Conditional Expression (4)'.

$$0.40 < F41/F4T < 0.55 \quad (4)'$$

Here, in the zoom lens according to the present embodiment, it is preferable that, as shown in FIG. 1 and the like, the fourth-1 lens group G41 as the first sub-lens group include, in order from the object side: a cemented lens including a first positive lens (for example, a positive lens L411), a second positive lens (for example, a positive lens L412), and a negative lens (for example, a negative lens L413); and a third positive lens (for example, a positive lens L414). By applying the configuration to the fourth-1 lens group G41 which is the main imaging group in the fourth lens group G4, it is possible to satisfactorily correct mainly spherical aberration, comatic aberration, and curvature of field.

In the zoom lens according to the present embodiment, it is preferable that an aperture diaphragm St be provided in the fourth-1 lens group G41. More specifically, as shown in FIG. 1 and the like, the fourth-1 lens group G41 has a plurality of lenses (for example, lenses L411 to L414) and the aperture diaphragm St, and thus it is preferable that the aperture diaphragm St be disposed between two lenses (for example, between the lenses L413 and L414) adjacent to each other among the plurality of lenses. Since the aperture diaphragm St is disposed in the fourth-1 lens group G41, mechanical interference between the aperture diaphragm St and each lens group that moves during zooming is avoided. Thus, it is possible to efficiently use space. Further, an exit pupil position can be set to be close to the image side. Thus, when the zoom lens is used in an interchangeable lens camera, the zoom lens can be configured to be advantageous in avoiding interference between rays and a mount diameter.

Further, in the zoom lens according to the present embodiment, it is preferable that, as shown in FIG. 1 and the like, the fourth-2 lens group G42 as the second sub-lens group include at least a single positive lens (for example, a positive lens L421) and at least a single negative lens (for example, a negative lens L422). By applying the configuration to the fourth-2 lens group G42 which is movable during zooming and focusing, it is possible to satisfactorily correct fluctuation in chromatic aberration caused by movement of the lens groups.

Further, in the zoom lens according to the present embodiment, it is preferable that the fourth-2 lens group G42 include a cemented lens formed of a single positive lens (for example, a positive lens L421) and a single negative lens (for example, a negative lens L422). By applying the configuration to the fourth-2 lens group G42 which is movable during zooming and focusing, it is possible to satisfactorily correct fluctuation in chromatic aberration caused by movement of the lens groups while achieving reduction in size and weight.

Further, it is preferable that the zoom lens according to the present embodiment satisfy the following conditional expression (5).

$$0.8 < F43/F4W < 3.0 \tag{5}$$

where

F43 is a focal length of the third sub-lens group (fourth-3 lens group G43).

Conditional Expression (5) defines an appropriate range of a ratio of the focal length of the fourth-3 lens group G43 as the third sub-lens group to the focal length of the fourth lens group G4 at the wide-angle end. By satisfying Conditional Expression (5), the fourth lens group G4 can be configured to have a small size.

Here, in the zoom lens according to the present embodiment, it is preferable that the fourth-3 lens group G43 have a fourth-3A lens group G43A that is positioned to be closest to the object side and has a positive refractive power. In addition, by moving the fourth-3A lens group G43A as an image blur correction lens group in a direction perpendicular to the optical axis Z1, image blur caused when the optical system vibrates may be corrected. By setting the fourth-3A lens group G43A as the image blur correction lens group, it is possible to correct fluctuation in comatic aberration and aberration of the image plane caused when the lens group moves in the direction perpendicular to the optical axis Z1.

Further, it is preferable that the zoom lens according to the present embodiment satisfy the following conditional expression (6).

$$0.9 < F1/F3 < 1.8 \tag{6}$$

where

F1 is a focal length of the first lens group G1, and

F3 is a focal length of the third lens group G3.

Conditional Expression (6) defines an appropriate range of a ratio of the focal length of the first lens group G1 to the focal length of the third lens group G3. By satisfying Conditional Expression (6), it is possible to appropriately set balance of the respective powers of the first lens group G1, the second lens group G2, and the third lens group G3 constituting the main zooming section. Hence, it is possible to obtain a zoom lens which has a small size and in which aberrations are less likely to occur.

In addition, in order to ensure the effect, it is more preferable that a numerical value range of Conditional Expression (6) be set as a range of the following Conditional Expression (6)'.

$$1.0 < F1/F3 < 1.5 \tag{6'}$$

Here, in the zoom lens according to the present embodiment, it is preferable that each of the first lens group G1, the second lens group G2, and the third lens group G3 have at least one cemented lens. Since each of the first lens group G1, the second lens group G2, and the third lens group G3 has at least one cemented lens, it is possible to suppress fluctuation in aberrations caused by movement of movable groups during zooming.

Further, in the zoom lens according to the present embodiment, it is preferable that, as shown in FIG. 1 and the like, the first lens group G1 include two positive lenses (for example, positive lenses L12 and L13), and the following Conditional Expression (7) be satisfied.

$$80 < vd1 < 110 \tag{7}$$

where vd1 is a maximum value of an Abbe number of the positive lenses constituting the first lens group G1.

Conditional Expression (7) defines a range of the maximum value of the Abbe number of the positive lenses constituting the first lens group G1. By using a low dispersion material of which the Abbe number is greater than the lower limit of Conditional Expression (7), it is possible to efficiently correct chromatic aberration caused at the telephoto end.

In the zoom lens according to the present embodiment, an aspheric surface is provided in at least one sub-lens group of the fourth-1 lens group G41, the fourth-2 lens group G42, and the fourth-3 lens group G43. By providing the aspheric surface in at least one sub-lens group constituting the fourth lens group G4, it is possible to correct spherical aberration, comatic aberration, and curvature of field caused by each lens group, and it is possible to suppress fluctuation in aberrations during zooming and focusing.

3. Application Example for Optical Apparatus

FIG. 13 shows one configuration example of an imaging apparatus 100 as an example of the optical apparatus using the zoom lens according to the present embodiment. The imaging apparatus 100 is, for example, a digital still camera, and includes a camera block 10, a camera signal processing section 20, an image processing section 30, a liquid crystal display (LCD) 40, a reader/writer (R/W) 50, a central processing unit (CPU) 60, an input section 70, and a lens driving control section 80.

The camera block 10 has an imaging function, and includes: an optical system including the zoom lens 11; and an imaging device 12 such as a charge coupled device (CCD), a complementary metal oxide semiconductor (CMOS), or the like. The imaging device 12 converts an optical image, which is formed by the zoom lens 11, into an electrical signal, thereby outputting an imaging signal (image signal) corresponding to the optical image. As the zoom lens 11, the zoom lenses 1 to 3 of the respective configuration examples shown in FIGS. 1 to 3 are applicable.

The camera signal processing section 20 is configured to perform various signal processes, such as analog-to-digital conversion, noise removal, image quality correction, and conversion into luminance and chromatic difference signals, on an image signal which is output from the imaging device 12.

The image processing section 30 is configured to perform processes of recording and reproducing the image signal, and to perform a process of encoding for compression and decoding for decompression on an image signal based on a predetermined image data format, a process of conversion of data specification such as resolution, and the like.

The LCD 40 has a function to display various data such as a condition of the operation performed by a user with the aid of the input section 70 and a photographed image. The R/W 50 is configured to write image data, which is encoded by the image processing section 30, into the memory card 1000 and additionally read the image data which is recorded on the memory card 1000. The memory card 1000 is, for example, a semiconductor memory which is removable from a slot connected to the R/W 50.

The CPU 60 is configured to function as a control processing section to control all the circuit blocks within the imaging apparatus 100, and to control the circuit blocks on the basis of the instruction input signals and the like from the input section 70. The input section 70 is formed of various switches and the like for assisting a user to perform necessary operations. The input section 70 includes, for example, a shutter release button for performing a shutter operation, a selection switch for selecting operation modes, and the like. The input section 70 is configured to output the instruction input signal in response to the user's operation to the CPU 60. The lens driving control section 80 is configured to control driving of the lenses disposed in the camera block 10, and to control a motor, which is not shown in the drawing, for driving the lenses within the zoom lens 11 on the basis of the control signal from the CPU 60.

Although not shown in the drawing, the imaging apparatus 100 has a shake detection section that detects shake of the apparatus caused by hand shake.

Next, operations of the imaging apparatus 100 will be described.

When the photographing is standby, an image signal captured by the camera block 10 under the control of the CPU 60 is output to the LCD 40 through the camera signal processing section 20 so as to be displayed as a camera live view image. Further, when the instruction input signal for zooming or focusing is input from the input section 70, the CPU 60 outputs a control signal to the lens driving control section 80, and moves predetermined lenses within the zoom lens 11 on the basis of the control of the lens driving control section 80.

When the not-shown shutter of the camera block 10 is operated by the instruction input signal from the input section 70, the captured image signal is output from the camera signal processing section 20 to the image processing section 30, is encoded for compression, and is converted into digital data of the predetermined data format. The converted data is output to the R/W 50 and is written in the memory card 1000.

In addition, for focusing, the lens driving control section 80 moves the predetermined lenses of the zoom lens 11 on the basis of the control signal received from the CPU 60, for example, when the shutter release button of the input section 70 is pressed halfway or pressed fully for recording (photography).

For reproduction of image data recorded in the memory card 1000, the R/W 50 reads out the prescribed image data from the memory card 1000 in response to the operation performed on the input section 70. The readout image data is decoded for decompression by the image processing section 30 and the reproduced image signal is then output to the LCD 40, thereby displaying the reproduced image.

Further, the CPU 60 moves the image blur correction lens group in the direction substantially perpendicular to the optical axis Z1 in accordance with an amount of shake by operating the lens driving control section 80 on the basis of a signal which is output from the shake detection section not shown in the drawing.

In addition, the embodiment shows an example in which the optical apparatus is applied to the digital still camera, but an application range of the optical apparatus is not limited to the digital still camera, and the embodiment can be applied to other various optical apparatuses. For example, the optical apparatus can be applied to a digital single-lens reflex camera, a digital non-reflex camera, and a digital video camera. Further, the optical apparatus can be widely applied as a camera section of a digital input/output apparatus such as a mobile phone equipped with a camera and an information terminal equipped with a camera. Furthermore, the optical apparatus can also be applied to an interchangeable-lens camera.

EXAMPLES

4. Numerical Examples of Lens

Next, specific numerical examples of the zoom lens according to the present embodiment will be described. Here, description will be given of numerical examples in which specific numerical values are applied to the zoom lenses 1 to 3 of the respective configurations shown in FIGS. 1 to 3.

It should be noted that, in the accompanying drawings and tables, the reference signs and the like are defined as follows. "Si" indicates an i-th surface, where the number i is a sequential number that sequentially increases from a surface closest to the object side. "ri" indicates a value (mm) of a paraxial radius of curvature of the i-th surface. "di" indicates a value (mm) of on-axis spacing between the i-th surface and the (i+1)th surface. "ni" indicates a value of a refractive index of the material of an optical element having the i-th surface at the d-line (a wavelength of 587.6 nm). "vi" indicates a value of an Abbe number of the material of the optical element having the i-th surface at the d-line. A surface of which the value of "ri" is "∞" means a flat surface or a diaphragm surface (aperture diaphragm St). A surface indicated by "STO" in "Si" means the aperture diaphragm St. "f" indicates a focal length of the whole optical system, "Fno" indicates an F number, and "ω" indicates a half angle of view.

Some lenses used in the respective numerical examples are configured such that the lens surface is formed to be aspheric. A surface indicated by "ASP" in "Si" means an aspheric surface. The aspheric shape is defined by the following aspheric surface expression. In addition, in the respective tables showing the aspheric surface coefficients to be described below, the reference sign "E-i" indicates an exponential expression having a base of 10, that is, "$10^{-i}$". For example, "0.12345E-05" indicates "$0.12345 \times 10^{-5}$".

Aspheric Surface Expression $$x = y^2 c^2 / [1 + \{1 - (1+K) y^2 c^2\}^{1/2}] + \Sigma An \cdot y^n$$

Here, x is a distance from a vertex of a lens surface in the direction of the optical axis, y is a height in the direction perpendicular to the optical axis, c is a paraxial radius of curvature (an inverse of the paraxial radius of curvature) at the vertex of the lens, K is a conic constant, and An is an n-th order aspheric surface coefficient.

Common Configurations in Numerical Examples

Any of the zoom lenses 1 to 3 to which the following numerical examples are applied has a configuration in which a preferable condition is satisfied. That is, any of the zoom lenses 1 to 3 is practically formed of four lens groups. In the zoom lens, in order from the object side, the first lens group G1 that has a positive refractive power, a second lens group G2 that has a negative refractive power, a third lens group G3 that has a positive refractive power, and a fourth lens group G4 that has a positive refractive power are arranged. The fourth lens group G4 includes, in order from the object side, the fourth-1 lens group G41 (first sub-lens group) that has a positive refractive power, the fourth-2 lens group G42 (second sub-lens group) that has a negative refractive power, and the fourth-3 lens group G43 (third sub-lens group). The fourth-3 lens group G43 has a positive refractive power.

In any of the zoom lenses 1 to 3, during zooming from the wide-angle end to the telephoto end, first lens group, the fourth-1 lens group G41 and the fourth-3 lens group G43 are stationary in the direction of the optical axis relative to the image plane. The second lens group G2, the third lens group G3, and the fourth-2 lens group G42 move in the direction of the optical axis. During zooming from the wide-angle end to the telephoto end, the fourth-2 lens group G42 moves in the optical axis direction to reduce spacing between the fourth-1 lens group G41 and the fourth-2 lens group G42. Further, during zooming from the wide-angle end to the telephoto end, the second lens group G2 and the third lens group G3 move to increase spacing between the first lens group G1 and the second lens group G2, to decrease spacing between the second lens group G2 and the third lens group G3, and to change spacing between the third lens group G3 and the fourth lens group G4, in the optical axis direction.

In any of the zoom lenses 1 to 3, by moving the fourth-2 lens group G42 during zooming, it is possible to change the focal length of the fourth lens group G4 which is a main imaging system of the zoom lens. Thus, it is possible to decrease the total length of the zoom lens.

In any of the zoom lenses 1 to 3, during focusing from the infinite-distance object to the close-range object, the fourth-2 lens group G42 moves. The fourth-3 lens group G43 has a fourth-3A lens group G43A that is positioned to be closest to the object side and has a positive refractive power. Thus, by setting the fourth-3A lens group G43A as the image blur correction lens group, it is possible to correct fluctuation in comatic aberration and aberration of the image plane caused when the lens group moves in the direction perpendicular to the optical axis Z1.

Numerical Example 1

Table 1 shows lens data of Numerical Example 1 of the zoom lens 1 which is shown in FIG. 1 and to which specific numerical values are applied. In the zoom lens 1, an eighteenth surface, a twenty-eighth surface, and a twenty-ninth surface are formed to be aspheric. Table 2 shows the 4th-order, 6th-order, 8th-order, and 10th-order aspheric surface coefficients A4, A6, A8, and A10 of the aspheric surfaces, together with the conic constant K.

Table 3 shows values of the focal length f, the F number Fno, the half angle of view ω, and the total lens length of the whole lens system at each of the wide-angle end, the middle focal length, and the telephoto end. In the zoom lens 1, during zooming from the wide-angle end to the telephoto end, a spacing d5 between the first lens group G1 and the second lens group G2 changes. Further, a spacing d12 between the second lens group G2 and the third lens group G3 changes. Furthermore, a spacing d17 between the third lens group G3 and the fourth-1 lens group G41 changes. Moreover, a spacing d25 between the fourth-1 lens group G41 and the fourth-2 lens group G42 changes. In addition, a spacing d28 between the fourth-2 lens group G42 and the fourth-3 lens group G43 changes. Table 3 further shows values of variable spacings at the wide-angle end, the middle focal length, and the telephoto end.

TABLE 1

| LENS GROUP | Si | ri | di | ni | νi |
|---|---|---|---|---|---|
| G1 | 1 | 88.50640 | 2.00000 | 1.92286 | 20.9 |
|  | 2 | 69.03340 | 7.48000 | 1.49700 | 81.6 |
|  | 3 | −2244.14030 | 0.15000 |  |  |
|  | 4 | 52.64380 | 7.50000 | 1.43700 | 95.1 |
|  | 5 | 365.77370 | d5 |  |  |
| G2 | 6 | −1884.01330 | 1.40000 | 1.91082 | 35.3 |
|  | 7 | 29.08180 | 5.40000 |  |  |
|  | 8 | −108.30650 | 1.30000 | 1.48749 | 70.4 |
|  | 9 | 32.19460 | 4.08000 | 1.92286 | 20.9 |
|  | 10 | −6726.97970 | 2.25000 |  |  |
|  | 11 | −52.32000 | 1.40000 | 1.90366 | 31.3 |
|  | 12 | −231.82473 | d12 |  |  |
| G3 | 13 | 466.47640 | 2.61000 | 1.74077 | 27.8 |
|  | 14 | −122.28400 | 0.10000 |  |  |
|  | 15 | 74.98420 | 1.50000 | 1.92286 | 20.9 |
|  | 16 | 40.54560 | 3.80000 | 1.60311 | 60.7 |
|  | 17 | −1213.04330 | d17 |  |  |
| G41 | 18 (ASP) | 118.46940 | 3.00000 | 1.69350 | 53.2 |
|  | 19 | −157.73410 | 0.15000 |  |  |
|  | 20 | 33.01776 | 3.25000 | 1.49700 | 81.6 |
|  | 21 | 128.97840 | 1.20000 | 1.80610 | 33.3 |
|  | 22 | 35.38520 | 3.70000 |  |  |
|  | 23 (STO) | ∞ | 10.13000 |  |  |
|  | 24 | 72.409010 | 4.00000 | 1.48749 | 70.4 |
|  | 25 | −49.530140 | d25 |  |  |
| G42 | 26 | 104.082250 | 2.38000 | 1.84666 | 23.8 |
|  | 27 | −85.383230 | 0.80000 | 1.76802 | 49.2 |
|  | 28 (ASP) | 25.088800 | d28 |  |  |
| G43 | 29 (ASP) | 31.010120 | 4.58000 | 1.51633 | 64.1 |
|  | 30 | −42.292110 | 1.00000 | 1.92286 | 20.9 |
|  | 31 | −75.111550 | 3.00000 |  |  |
|  | 32 | 85.725520 | 1.70000 | 1.61800 | 63.4 |
|  | 33 | 38.560000 | 5.32000 |  |  |
|  | 34 | −35.341730 | 2.49000 | 1.78472 | 25.7 |
|  | 35 | −26.581500 | 4.30000 |  |  |
|  | 36 | −28.771710 | 1.50000 | 1.88300 | 40.8 |
|  | 37 | −77.313880 | (BF) |  |  |

TABLE 2

EXAMPLE 1

|  | S18 | S28 | S29 |
|---|---|---|---|
| K | 0 | 0 | 0 |
| A4 | −2.96279E−06 | −1.26926E−06 | −9.25160E−07 |
| A6 | −8.22788E−10 | −3.93738E−09 | 3.36839E−10 |
| A8 | 2.42576E−14 | 8.82062E−12 | −2.53630E−11 |
| A10 | 0 | −2.02847E−14 | 9.61516E−14 |

TABLE 3

EXAMPLE 1

|  | WIDE-ANGLE END | MIDDLE POSITION | TELE-PHOTO END |
|---|---|---|---|
| f | 72.0974 | 122.9480 | 193.9726 |
| Fno | 4.1474 | 4.0559 | 4.1269 |
| ω | 16.8996 | 9.8143 | 6.1680 |
| TOTAL LENS LENGTH | 190.0000 | 190.0000 | 190.0000 |
| d5 | 1.5000 | 22.9023 | 32.3677 |
| d12 | 24.0067 | 16.6654 | 1.1000 |
| d17 | 16.4610 | 2.4000 | 8.5000 |
| d25 | 4.5426 | 2.4692 | 2.8188 |
| d28 | 7.0924 | 9.1658 | 8.8162 |

In the zoom lens 1 shown in FIG. 1, the first lens group G1 includes, in order from the object side: a cemented lens that is formed by cementing a negative meniscus lens L11 and a positive lens L12; and a positive lens L13. The positive lens L13 is made of a material having an Abbe number of 95.1, and is configured to satisfactorily correct chromatic aberration particularly at the telephoto end.

The second lens group G2 includes, in order from the object side: a cemented lens that is formed by cementing a negative lens L21, a negative lens L22, and a positive lens L23; and a negative lens L24. By applying the configuration of the present example to the second lens group G2, it is possible to suppress fluctuation in aberrations mostly during zooming.

The third lens group G3 includes a cemented lens that is formed by cementing a positive lens L31, a negative lens L32, and a positive lens L33, in order from the object side. By applying the configuration of the present example to the third lens group G3, it is possible to suppress fluctuation in aberrations mostly during zooming.

The fourth-1 lens group G41 includes, in order from the object side: the cemented lens that is formed by cementing the positive lens L411, the positive lens L412, and the negative lens L413; the aperture diaphragm St; and the positive lens L414 formed as a biconvex lens. The object side surface of the positive lens L411 is formed to be aspheric.

By applying the configuration of the present example to the fourth-1 lens group G41 which has a largest positive refractive power in the fourth lens group G4, it is possible to correct spherical aberration, comatic aberration, and curvature of field caused by the fourth lens group G4.

The fourth-2 lens group G42 includes a cemented lens that is formed by cementing the positive lens L421 and the negative lens L422, in order from the object side. The image side surface of the negative lens L422 is formed to be aspheric. By applying the configuration of the present example to the fourth-2 lens group G42, it is possible to embody lightweight focusing lens group while suppressing fluctuation in chromatic aberration during zooming and focusing.

The fourth-3 lens group G43 includes, in order from the object side: a cemented lens that is formed by cementing a positive lens L431 and a negative lens L432, a negative lens L433, a positive lens L434, and a negative lens L435. The object side surface of the positive lens L431 is formed to be aspheric. By applying the configuration of the present example to the fourth-3 lens group G43, it is possible to set the exit pupil position close to the image side. As a result, in a case of using the interchangeable lens camera, it is possible to adopt a configuration which is advantageous in avoiding interference between the rays and the mount diameter.

The fourth-3A lens group G43A includes the cemented lens formed of the positive lens L431 and the negative lens L432. Thus, by moving the lens group in the direction perpendicular to the optical axis Z1, it is possible to correct image blur.

Numerical Example 2

Table 4 shows lens data of Numerical Example 2 of the zoom lens 2 which is shown in FIG. 2 and to which specific numerical values are applied. In the zoom lens 2, a twenty-ninth surface is formed to be aspheric. Table 5 shows the 4th-order, 6th-order, 8th-order, and 10th-order aspheric surface coefficients A4, A6, A8, and A10 of the aspheric surfaces, together with the conic constant K.

Table 6 shows values of the focal length f, the F number Fno, the half angle of view ω, and the total lens length of the whole lens system at each of the wide-angle end, the middle focal length, and the telephoto end. In the zoom lens 2, during zooming from the wide-angle end to the telephoto end, a spacing d5 between the first lens group G1 and the second lens group G2 changes. Further, a spacing d12 between the second lens group G2 and the third lens group G3 changes. Furthermore, a spacing d17 between the third lens group G3 and the fourth-1 lens group G41 changes. Moreover, a spacing d25 between the fourth-1 lens group G41 and the fourth-2 lens group G42 changes. In addition, a spacing d28 between the fourth-2 lens group G42 and the fourth-3 lens group G43 changes. Table 6 further shows values of variable spacings at the wide-angle end, the middle focal length, and the telephoto end.

TABLE 4

| LENS GROUP | Si | ri | di | ni | νi |
|---|---|---|---|---|---|
| G1 | 1 | 83.20300 | 2.00000 | 2.00100 | 29.1 |
|  | 2 | 55.47660 | 7.77000 | 1.49700 | 81.6 |
|  | 3 | 419.33270 | 0.15000 |  |  |
|  | 4 | 51.08530 | 7.35000 | 1.59282 | 68.6 |
|  | 5 | 308.43200 | d5 |  |  |
| G2 | 6 | −1503.57230 | 1.30000 | 1.91082 | 35.3 |
|  | 7 | 29.64520 | 6.65000 |  |  |
|  | 8 | −136.76740 | 1.25000 | 1.48749 | 70.4 |
|  | 9 | 34.29780 | 3.68000 | 1.92286 | 20.9 |
|  | 10 | 2708.66390 | 2.00000 |  |  |
|  | 11 | −49.58920 | 1.50000 | 1.88300 | 40.8 |
|  | 12 | −400.15980 | d12 |  |  |
| G3 | 13 | −427.05090 | 2.36000 | 1.83481 | 42.7 |
|  | 14 | −71.14420 | 0.15000 |  |  |
|  | 15 | 104.04710 | 3.27000 | 1.60739 | 56.7 |
|  | 16 | −76.82190 | 1.40000 | 1.92286 | 20.9 |
|  | 17 | −272.47460 | d17 |  |  |
| G41 | 18 | 58.36380 | 2.73000 | 1.91082 | 35.3 |
|  | 19 | 1316.04260 | 0.15000 |  |  |
|  | 20 | 26.49850 | 4.60000 | 1.49700 | 81.6 |
|  | 21 | 179.17860 | 1.25000 | 1.90366 | 31.3 |
|  | 22 | 26.01049 | 4.00000 |  |  |
|  | 23 (STO) | ∞ | 0.50000 |  |  |
|  | 24 | 45.79370 | 2.80000 | 1.49700 | 81.6 |
|  | 25 | −443.38390 | d25 |  |  |
| G42 | 26 | 115.46830 | 2.40000 | 1.84666 | 23.8 |
|  | 27 | −71.41860 | 0.80000 | 1.78590 | 43.9 |
|  | 28 | 29.99190 | d28 |  |  |
| G43 | 29 (ASP) | 31.37070 | 4.57000 | 1.55332 | 71.7 |
|  | 30 | −48.68450 | 0.90000 | 1.92286 | 20.9 |
|  | 31 | −78.79210 | 3.50000 |  |  |
|  | 32 | 124.60550 | 1.70000 | 1.72000 | 50.3 |
|  | 33 | 34.53720 | 6.50000 |  |  |
|  | 34 | −158.50350 | 4.09000 | 1.68893 | 31.2 |

TABLE 4-continued

| LENS GROUP | Si | ri | di | ni | νi |
|---|---|---|---|---|---|
| | 35 | −23.67110 | 1.20000 | | |
| | 36 | −23.66810 | 1.50000 | 1.88300 | 40.8 |
| | 37 | −110.51130 | (BF) | | |

TABLE 5

EXAMPLE 2

S29

| K | 0 |
|---|---|
| A4 | −2.55727E−06 |
| A6 | 1.90957E−10 |
| A8 | −1.56027E−11 |
| A10 | 0 |

TABLE 6

EXAMPLE 2

| | WIDE-ANGLE END | MIDDLE POSITION | TELE-PHOTO END |
|---|---|---|---|
| f | 72.0971 | 104.9932 | 193.9747 |
| Fno | 4.1530 | 4.1509 | 4.1454 |
| ω | 16.7416 | 11.5407 | 6.1760 |
| TOTAL LENS LENGTH | 180.0000 | 180.0000 | 180.0000 |
| d5 | 1.6826 | 20.5556 | 36.0624 |
| d12 | 19.5379 | 16.6240 | 1.2000 |
| d17 | 18.5419 | 2.5828 | 2.5000 |
| d25 | 8.8204 | 4.8831 | 2.5000 |
| d28 | 6.1943 | 10.1316 | 12.5147 |

In the zoom lens 2 shown in FIG. 2, the first lens group G1 includes, in order from the object side: a cemented lens that is formed by cementing a negative meniscus lens L11 and a positive lens L12; and a positive lens L13.

The second lens group G2 includes, in order from the object side: a cemented lens that is formed by cementing a negative lens L21, a negative lens L22, and a positive lens L23; and a negative lens L24. By applying the configuration of the present example to the second lens group G2, it is possible to suppress fluctuation in aberrations mostly during zooming.

The third lens group G3 includes a cemented lens that is formed by cementing a positive lens L31, a negative lens L32, and a positive lens L33, in order from the object side. By applying the configuration of the present example to the third lens group G3, it is possible to suppress fluctuation in aberrations mostly during zooming.

The fourth-1 lens group G41 includes, in order from the object side: the cemented lens that is formed by cementing the positive lens L411, the positive lens L412, and the negative lens L413; the aperture diaphragm St; and the positive lens L414 formed as a biconvex lens.

By applying the configuration of the present example to the fourth-1 lens group G41 which has a largest positive refractive power in the fourth lens group G4, it is possible to correct spherical aberration, comatic aberration, and curvature of field caused by the fourth lens group G4.

The fourth-2 lens group G42 includes a cemented lens that is formed by cementing the positive lens L421 and the negative lens L422, in order from the object side. By applying the configuration of the present example to the fourth-2 lens group G42, it is possible to embody lightweight focusing lens group while suppressing fluctuation in chromatic aberration during zooming and focusing.

The fourth-3 lens group G43 includes, in order from the object side: a cemented lens that is formed by cementing a positive lens L431 and a negative lens L432, a negative lens L433, a positive lens L434, and a negative lens L435. The object side surface of the positive lens L431 is formed to be aspheric. By applying the configuration of the present example to the fourth-3 lens group G43, it is possible to set the exit pupil position close to the image side. As a result, in a case of using the interchangeable lens camera, it is possible to adopt a configuration which is advantageous in avoiding interference between the rays and the mount diameter.

The fourth-3A lens group G43A includes the cemented lens formed of the positive lens L431 and the negative lens L432. Thus, by moving the lens group in the direction perpendicular to the optical axis Z1, it is possible to correct image blur.

Numerical Example 3

Table 7 shows lens data of Numerical Example 3 of the zoom lens 3 which is shown in FIG. 3 and to which specific numerical values are applied. In the zoom lens 3, a thirtieth surface is formed to be aspheric. Table 8 shows the 4th-order, 6th-order, 8th-order, and 10th-order aspheric surface coefficients A4, A6, A8, and A10 of the aspheric surfaces, together with the conic constant K.

Table 9 shows values of the focal length f, the F number Fno, the half angle of view ω, and the total lens length of the whole lens system at each of the wide-angle end, the middle focal length, and the telephoto end. In the zoom lens 3, during zooming from the wide-angle end to the telephoto end, a spacing d6 between the first lens group G1 and the second lens group G2 changes. Further, a spacing d13 between the second lens group G2 and the third lens group G3 changes. Furthermore, a spacing d18 between the third lens group G3 and the fourth-1 lens group G41 changes. Moreover, a spacing d26 between the fourth-1 lens group G41 and the fourth-2 lens group G42 changes. In addition, a spacing d29 between the fourth-2 lens group G42 and the fourth-3 lens group G43 changes. Table 9 further shows values of variable spacings at the wide-angle end, the middle focal length, and the telephoto end.

TABLE 7

| LENS GROUP | Si | ri | di | ni | νi |
|---|---|---|---|---|---|
| G1 | 1 | 94.12700 | 2.00000 | 2.00100 | 29.1 |
| | 2 | 71.81110 | 0.15000 | | |
| | 3 | 69.36400 | 7.77000 | 1.43700 | 95.1 |
| | 4 | −1134.61630 | 0.15000 | | |
| | 5 | 57.06370 | 7.35000 | 1.43700 | 95.1 |
| | 6 | 257.40970 | d6 | | |
| G2 | 7 | −243.06690 | 1.30000 | 1.91082 | 35.3 |
| | 8 | 39.12170 | 6.65000 | | |
| | 9 | −151.50560 | 1.25000 | 1.49700 | 81.6 |
| | 10 | 43.95890 | 3.68000 | 1.92286 | 20.9 |
| | 11 | −15626.91040 | 2.00000 | | |
| | 12 | −68.96300 | 1.50000 | 1.88300 | 40.8 |
| | 13 | −370.66110 | d13 | | |
| G3 | 14 | −472.06140 | 2.36000 | 1.83481 | 42.7 |
| | 15 | −86.73200 | 0.15000 | | |
| | 16 | 103.69210 | 3.27000 | 1.63854 | 55.5 |

TABLE 7-continued

| LENS GROUP | Si | ri | di | ni | νi |
|---|---|---|---|---|---|
| | 17 | −95.90460 | 1.40000 | 1.92286 | 20.9 |
| | 18 | −476.77690 | d18 | | |
| G41 | 19 | 40.46010 | 2.73000 | 1.74950 | 35.0 |
| | 20 | 863.45340 | 0.15000 | | |
| | 21 | 27.69130 | 4.60000 | 1.49700 | 81.6 |
| | 22 | ∞ | 1.25000 | 1.90366 | 31.3 |
| | 23 | 25.97400 | 6.00000 | | |
| | 24 (STO) | ∞ | 0.50000 | | |
| | 25 | 53.66530 | 2.80000 | 1.49700 | 81.6 |
| | 26 | −346.64660 | d26 | | |
| G42 | 27 | 284.42620 | 2.40000 | 1.84666 | 23.8 |
| | 28 | −49.79830 | 0.80000 | 1.74400 | 44.7 |
| | 29 | 30.48940 | d29 | | |
| G43 | 30 (ASP) | 37.46440 | 4.57000 | 1.55332 | 71.7 |
| | 31 | −78.27500 | 0.90000 | 1.92286 | 20.9 |
| | 32 | −177.75350 | 3.50000 | | |
| | 33 | 38.18130 | 1.00000 | 1.51680 | 64.2 |
| | 34 | 31.13920 | 3.35505 | | |
| | 35 | −313.60070 | 3.44667 | 1.60342 | 38.0 |
| | 36 | −34.37100 | 3.75014 | | |
| | 37 | −34.02700 | 1.00000 | 1.71300 | 53.9 |
| | 38 | 247.52570 | (BF) | | |

TABLE 8

EXAMPLE 3

| | S30 |
|---|---|
| K | 0 |
| A4 | −1.35639E−06 |
| A6 | 1.64602E−09 |
| A8 | −6.65590E−12 |
| A10 | 0 |

TABLE 9

EXAMPLE 3

| | WIDE-ANGLE END | MIDDLE POSITION | TELE-PHOTO END |
|---|---|---|---|
| f | 72.0978 | 104.9953 | 193.9693 |
| Fno | 4.0949 | 3.9668 | 4.1501 |
| ω | 16.9716 | 11.6471 | 6.2203 |
| TOTAL LENS LENGTH | 190.0000 | 190.0000 | 190.0000 |
| d6 | 1.6826 | 25.5853 | 45.0200 |
| d13 | 25.3374 | 20.8880 | 1.5000 |
| d18 | 22.0000 | 2.5467 | 2.5000 |
| d26 | 7.0065 | 4.2392 | 2.0000 |
| d29 | 8.9636 | 11.7309 | 13.9701 |

In the zoom lens 3 shown in FIG. 3, the first lens group G1 includes, in order from the object side: a negative meniscus lens L11; a positive lens L12; and a positive lens L13. The positive lens L12 and the positive lens L13 are made of a material having an Abbe number of 95.1, and are configured to satisfactorily correct chromatic aberration particularly at the telephoto end.

The second lens group G2 includes, in order from the object side: a cemented lens that is formed by cementing a negative lens L21, a negative lens L22, and a positive lens L23; and a negative lens L24. By applying the configuration of the present example to the second lens group G2, it is possible to suppress fluctuation in aberrations mostly during zooming.

The third lens group G3 includes a cemented lens that is formed by cementing a positive lens L31, a negative lens L32, and a positive lens L33, in order from the object side. By applying the configuration of the present example to the third lens group G3, it is possible to suppress fluctuation in aberrations mostly during zooming.

The fourth-1 lens group G41 includes, in order from the object side: the cemented lens that is formed by cementing the positive lens L411, the positive lens L412, and the negative lens L413; the aperture diaphragm St; and the positive lens L414 formed as a biconvex lens.

By applying the configuration of the present example to the fourth-1 lens group G41 which has a largest positive refractive power in the fourth lens group G4, it is possible to correct spherical aberration, comatic aberration, and curvature of field caused by the fourth lens group G4.

The fourth-2 lens group G42 includes a cemented lens that is formed by cementing the positive lens L421 and the negative lens L422, in order from the object side. By applying the configuration of the present example to the fourth-2 lens group G42, it is possible to embody light-weight focusing lens group while suppressing fluctuation in chromatic aberration during zooming and focusing.

The fourth-3 lens group G43 includes, in order from the object side: a cemented lens that is formed by cementing a positive lens L431 and a negative lens L432, a negative lens L433, a positive lens L434, and a negative lens L435. The object side surface of the positive lens L431 is formed to be aspheric. By applying the configuration of the present example to the fourth-3 lens group G43, it is possible to set the exit pupil position close to the image side. As a result, in a case of using the interchangeable lens camera, it is possible to adopt a configuration which is advantageous in avoiding interference between the rays and the mount diameter.

The fourth-3A lens group G43A includes the cemented lens formed of the positive lens L431 and the negative lens L432. Thus, by moving the lens group in the direction perpendicular to the optical axis Z1, it is possible to correct image blur.

Other Numerical Data of Examples

Tables 10 and 11 shows collection of values relating to the above-mentioned conditional expressions in the numerical examples. As can be seen from Tables 10 and 11, the values of the numerical examples are within the numerical value ranges of the conditional expressions.

TABLE 10

| PARAMETER | EXAMPLE 1 | EXAMPLE 2 | EXAMPLE 3 |
|---|---|---|---|
| 0L4 | 107.1 | 99.14 | 100.0 |
| F4T | 110.0 | 130.4 | 149.8 |
| F4W | 101.1 | 109.2 | 130.2 |
| FW | 72.1 | 72.1 | 72.1 |
| F41 | 50.4 | 64.5 | 69.3 |
| F43 | 266.7 | 157.6 | 120.3 |
| F1 | 87.0 | 87.4 | 106.9 |
| F3 | 79.1 | 66.9 | 76.7 |

TABLE 11

| CONDITIONAL EXPRESSION | | EXAMPLE 1 | EXAMPLE 2 | EXAMPLE 3 |
|---|---|---|---|---|
| (1) | OL4/F4T | 0.97 | 0.76 | 0.67 |
| (2) | F4W/FW | 1.40 | 1.51 | 1.81 |
| (3) | F4T/F4W | 1.09 | 1.19 | 1.15 |
| (4) | F41/F4T | 0.46 | 0.49 | 0.46 |
| (5) | F43/F4W | 2.64 | 1.44 | 0.92 |
| (6) | F1/F3 | 1.10 | 1.31 | 1.39 |
| (7) | ν d1 | 95.1 | 81.6 | 95.1 |

Aberration Capabilities of Examples

Figure 4:
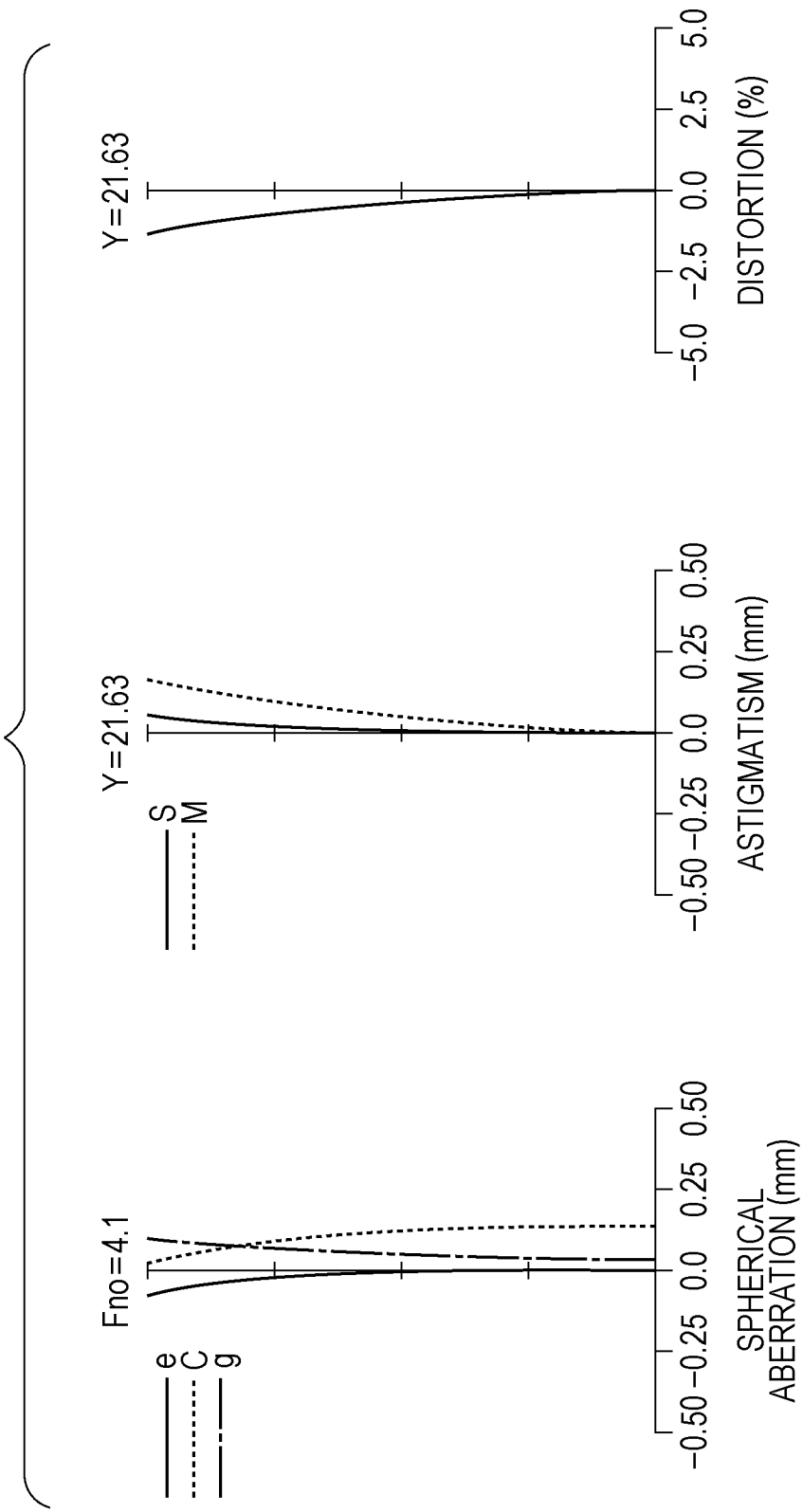
FIG. 4 is an aberration diagram illustrating various aberrations at the wide-angle end in Numerical Example 1 where specific numerical values are applied to the zoom lens shown in FIG. 1.
Figure 5:
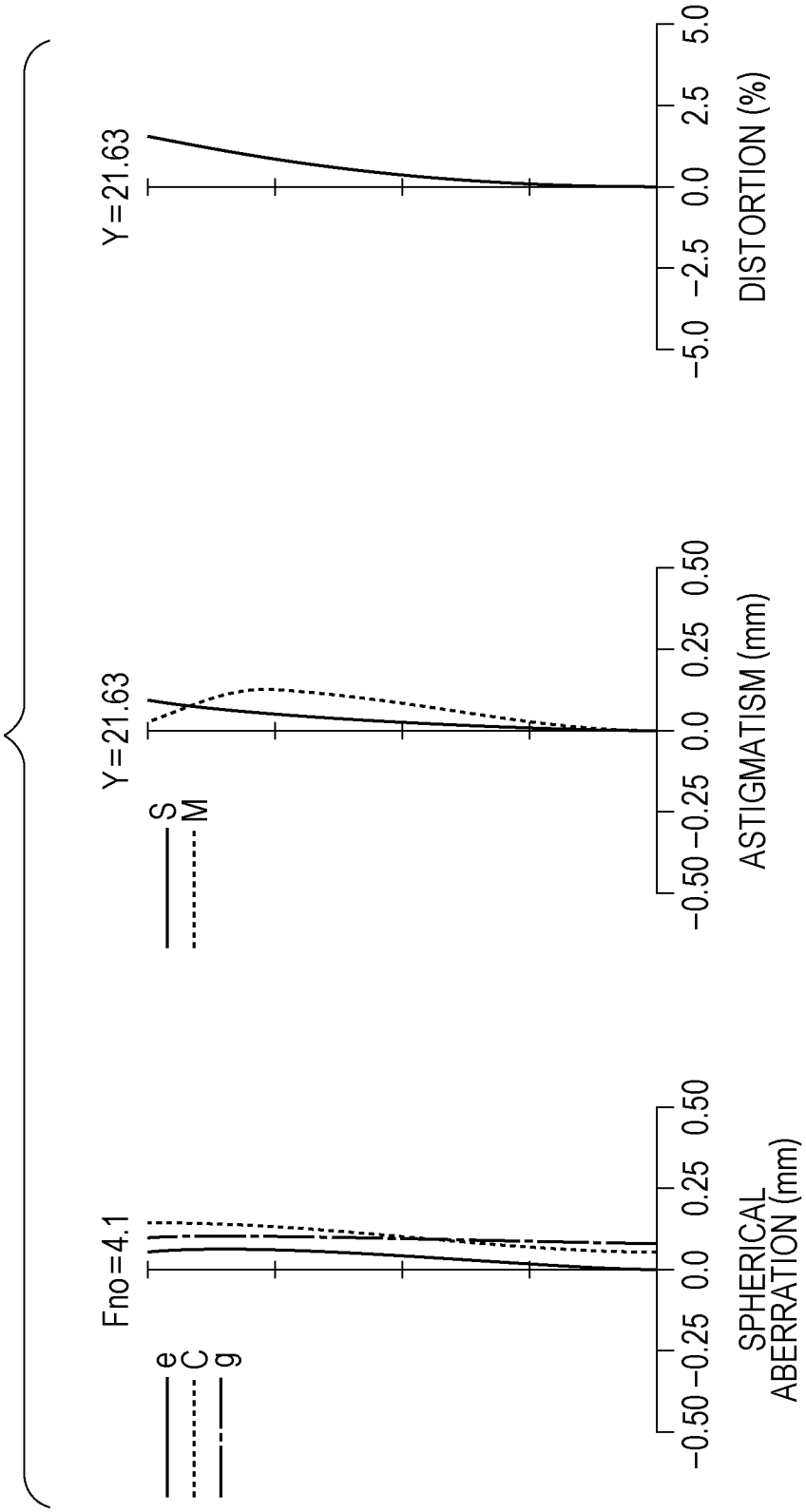
FIG. 5 is an aberration diagram illustrating various aberrations at the middle focal length in Numerical Example 1 where specific numerical values are applied to the zoom lens shown in FIG. 1.
Figure 6:
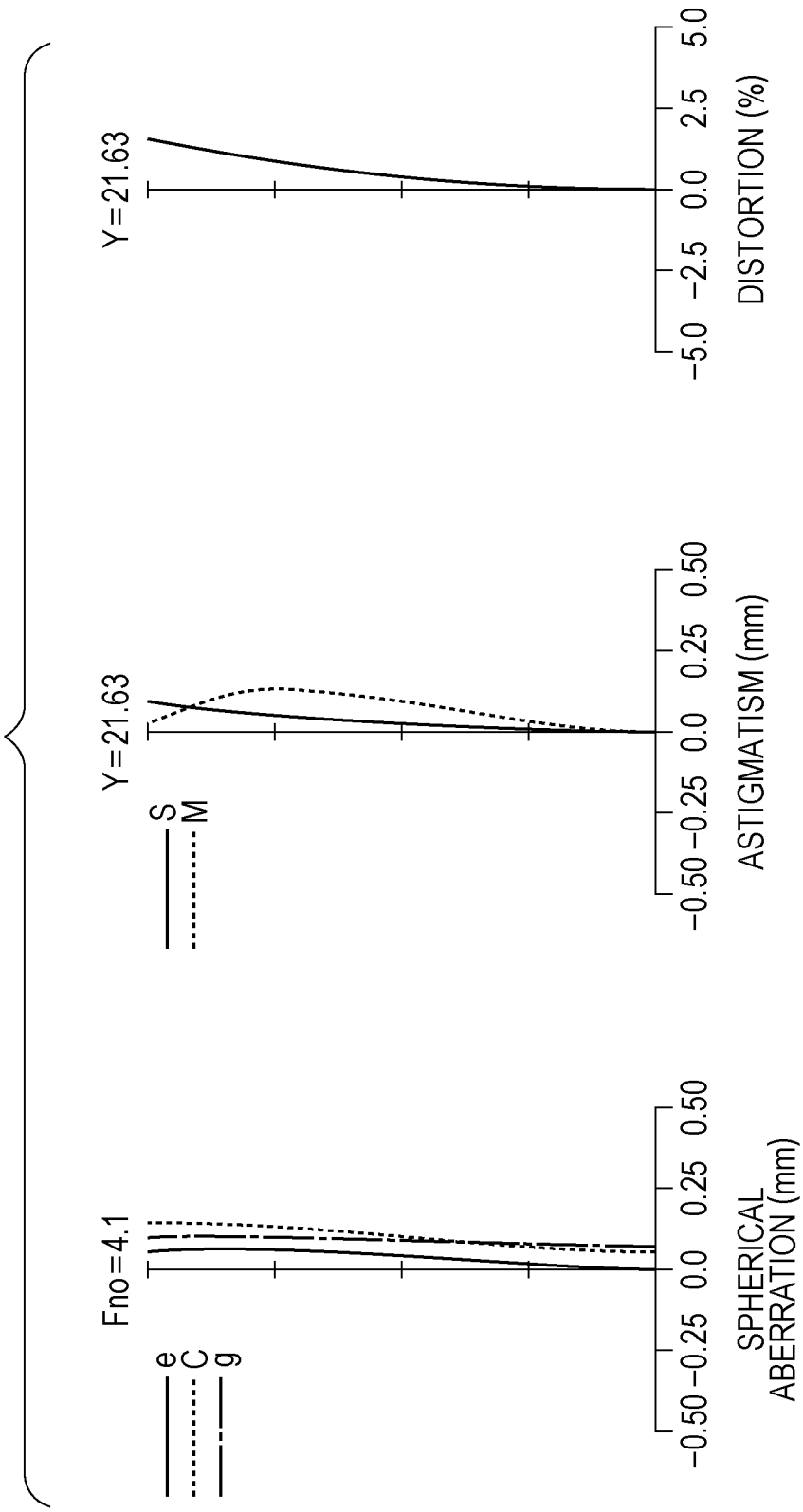
FIG. 6 is an aberration diagram illustrating various aberrations at the telephoto end in Numerical Example 1 where specific numerical values are applied to the zoom lens shown in FIG. 1.
Figure 7:
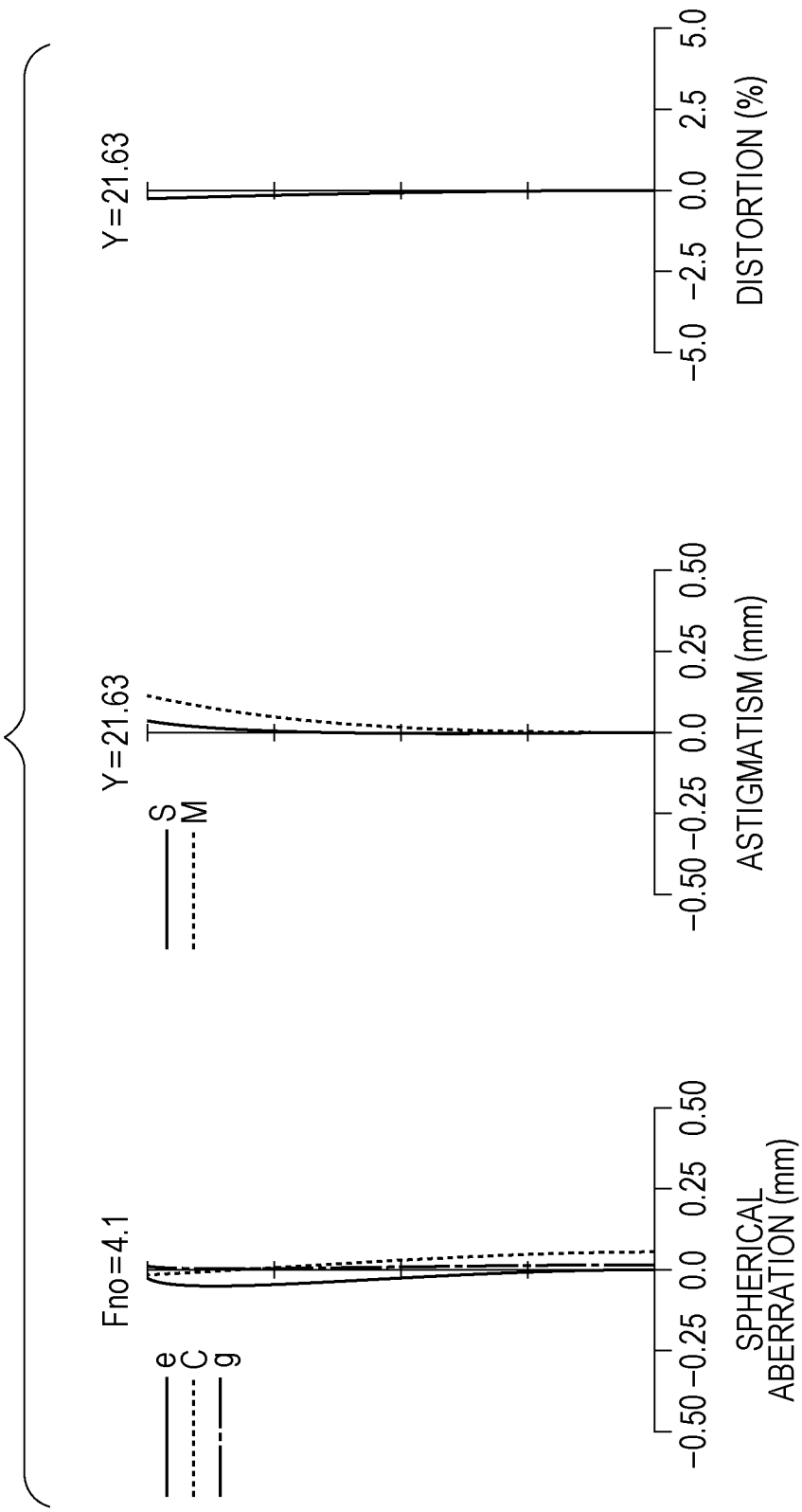
FIG. 7 is an aberration diagram illustrating various aberrations at the wide-angle end in Numerical Example 2 where specific numerical values are applied to the zoom lens shown in FIG. 2.
Figure 8:
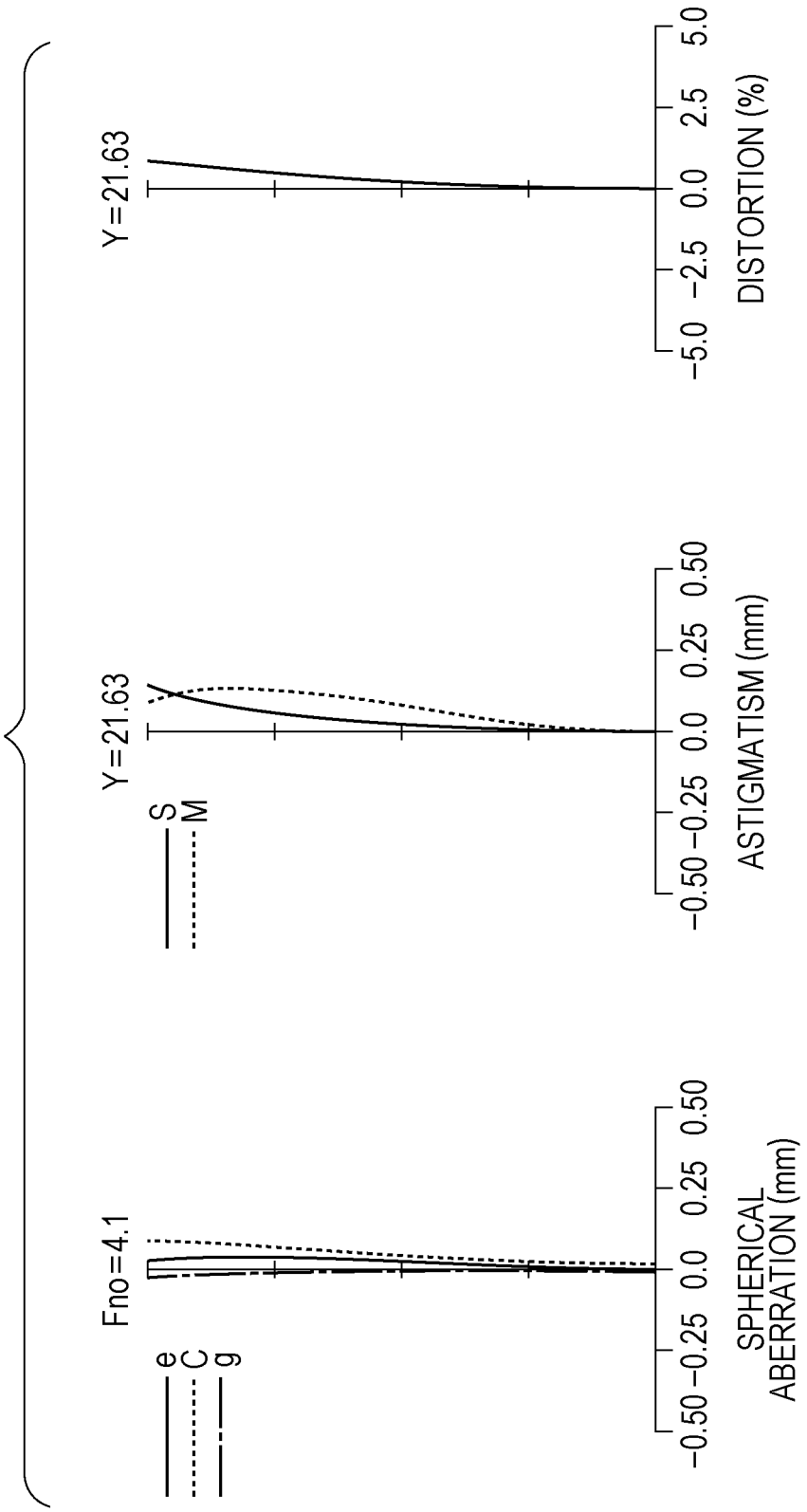
FIG. 8 is an aberration diagram illustrating various aberrations at the middle focal length in Numerical Example 2 where specific numerical values are applied to the zoom lens shown in FIG. 2.
Figure 9:
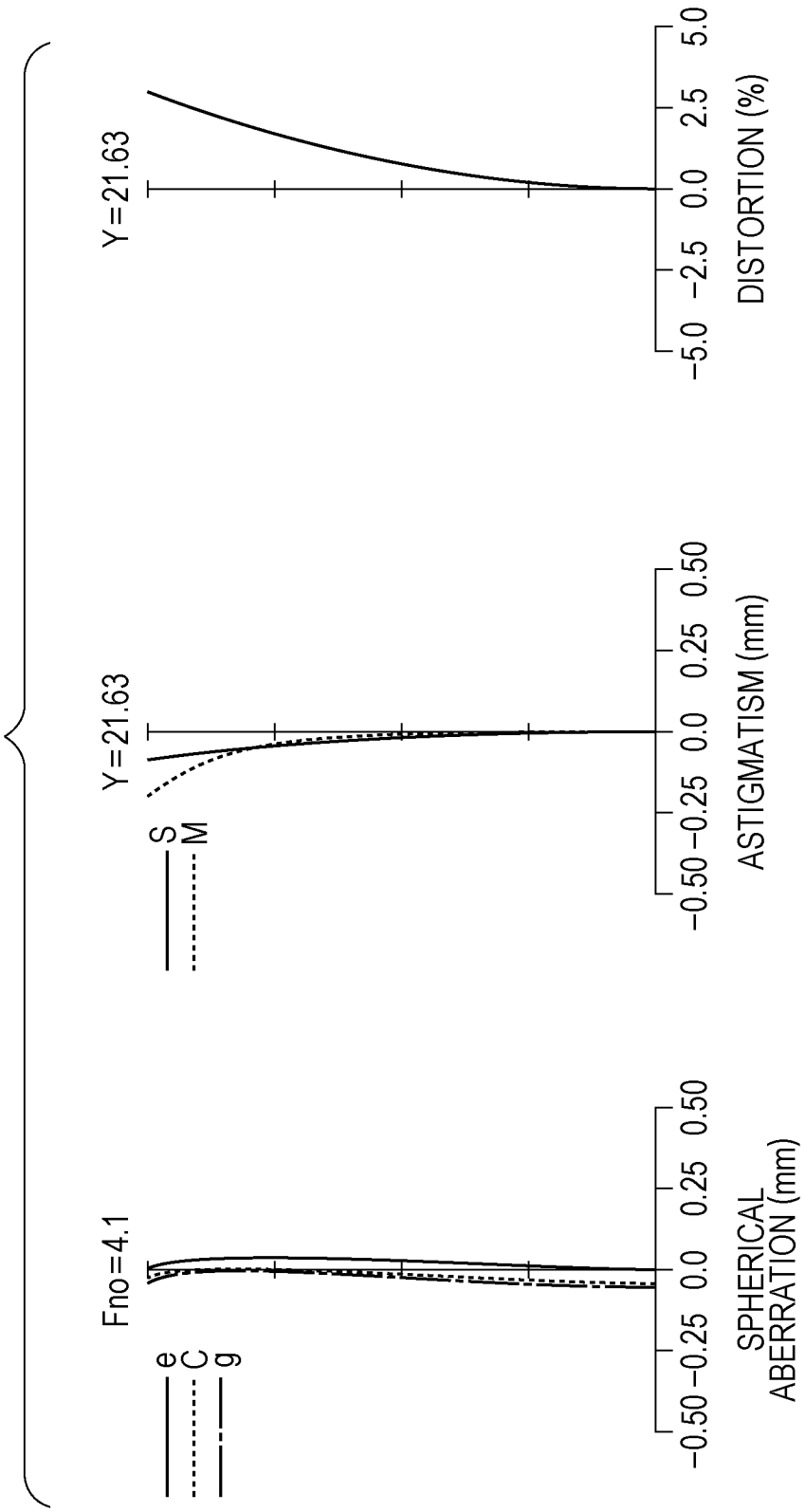
FIG. 9 is an aberration diagram illustrating various aberrations at the telephoto end in Numerical Example 2 where specific numerical values are applied to the zoom lens shown in FIG. 2.
Figure 10:
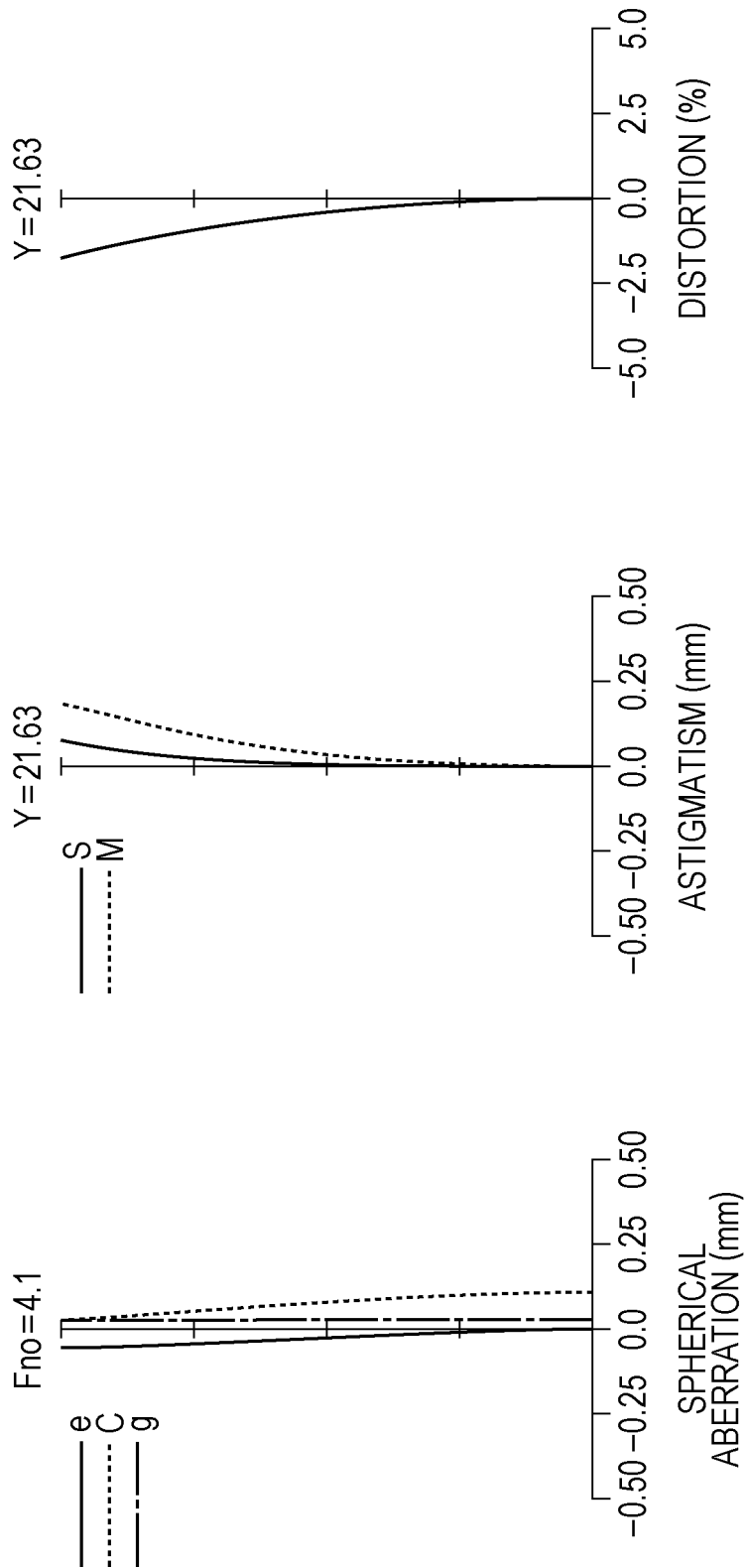
FIG. 10 is an aberration diagram illustrating various aberrations at the wide-angle end in Numerical Example 3 where specific numerical values are applied to the zoom lens shown in FIG. 3.
Figure 11:
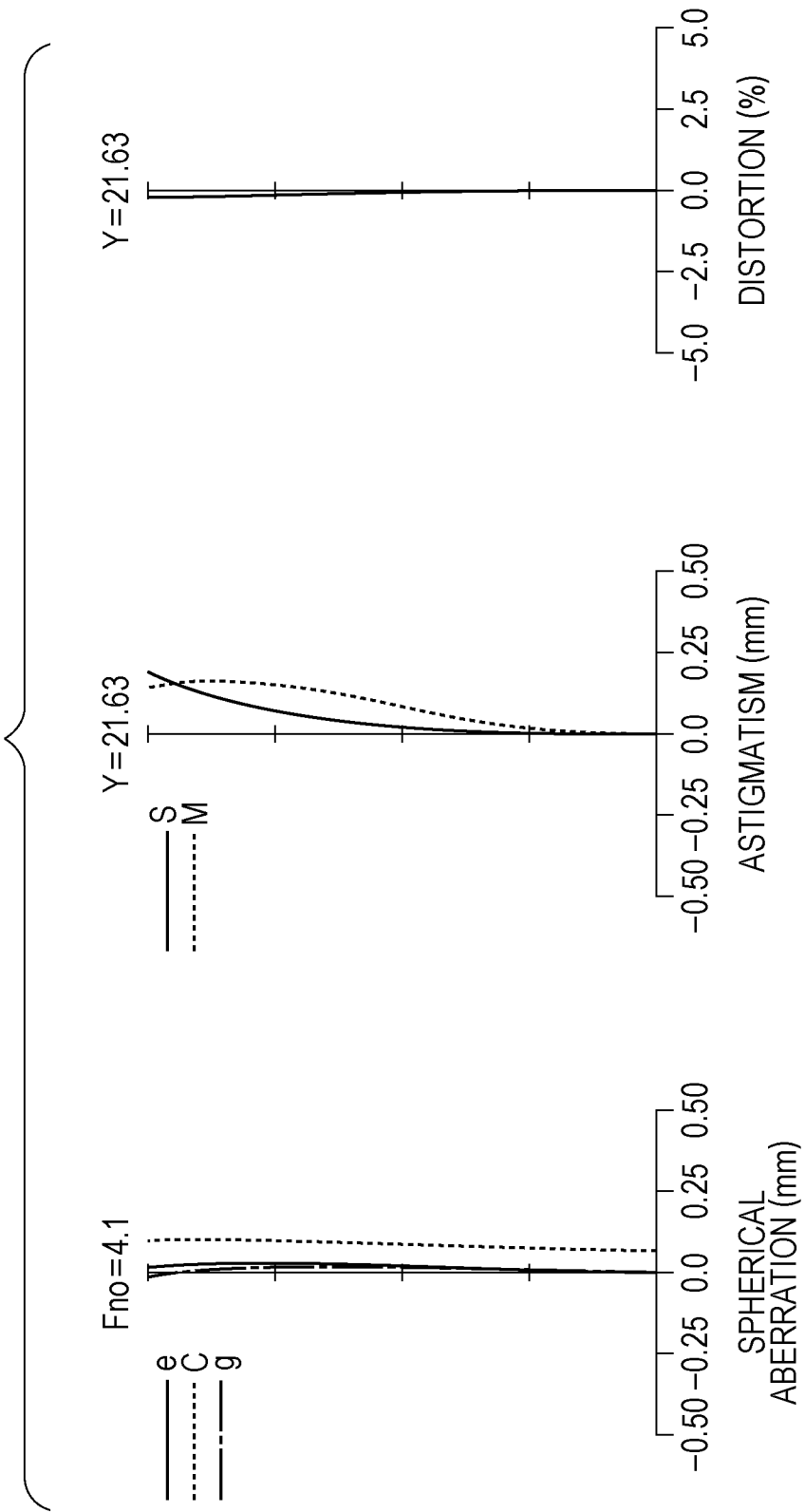
FIG. 11 is an aberration diagram illustrating various aberrations at the middle focal length in Numerical Example 3 where specific numerical values are applied to the zoom lens shown in FIG. 3.
Figure 12:
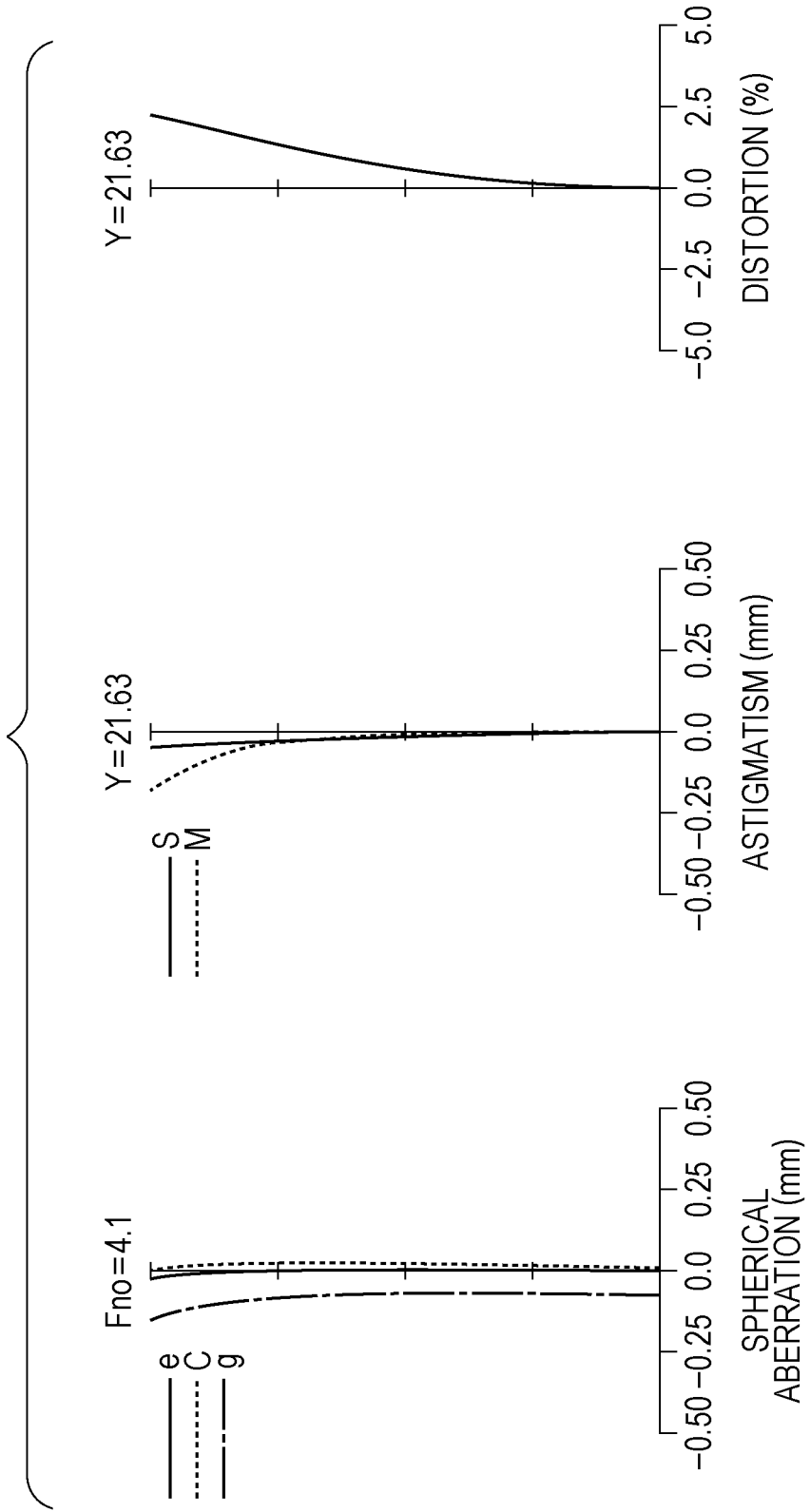
FIG. 12 is an aberration diagram illustrating various aberrations at the telephoto end in Numerical Example 3 where specific numerical values are applied to the zoom lens shown in FIG. 3.

FIGS. 4 to 6 show various aberrations in Numerical Example 1. FIG. 4 shows various aberrations at the wide-angle end, FIG. 5 shows various aberrations at the middle focal length, and FIG. 6 shows various aberrations at the telephoto end. Further, FIGS. 7 to 9 show various aberrations in Numerical Example 2. FIG. 7 shows various aberrations at the wide-angle end, FIG. 8 shows various aberrations at the middle focal length, and FIG. 9 shows various aberrations at the telephoto end. Further, FIGS. 10 to 12 show various aberrations in Numerical Example 3. FIG. 10 shows various aberrations at the wide-angle end, FIG. 11 shows various aberrations at the middle focal length, and FIG. 12 shows various aberrations at the telephoto end.

FIGS. 4 to 12 show, as various aberrations, spherical aberration, astigmatism (curvature of field), and distortion. Such aberration diagrams show aberrations in which a wavelength of the e-line (546.07 nm) is set as a reference wavelength. In each spherical aberration diagram, the wavelength of the C-line (656.3 nm, the dashed line) and the wavelength of the g-line (435.8 nm, chain line) are also shown. In each astigmatism diagram, the solid line (S) indicates a sagittal image plane, and the dashed line (M) indicates a meridional image plane.

As can be seen from the aberration diagrams, in the zoom lenses according to numerical examples, all the aberrations at the wide-angle end, the middle focal length between the wide-angle end and the telephoto end, and the telephoto end are corrected with good balance.

5. Other Embodiment

The technology based on the present disclosure is not limited to the description of the embodiments and examples, and may be modified into various forms.

For example, the shapes of components and the numerical values described or shown in the above-mentioned embodiments are only illustrative examples of the embodiments for carrying out the present technology, and they should not be interpreted as limiting the technical scope of the present technology.

Further, in the embodiments and examples, the configuration of the four lens groups in practice has been described, but may be a configuration in which a lens having substantially no refractive power is further provided.

In addition, for example, the present technology may adopt the following configurations.

[1]

A zoom lens including, in order from an object side:
a first lens group that has a positive refractive power;
a second lens group that has a negative refractive power;
a third lens group that has a positive refractive power; and
a fourth lens group that has a positive refractive power,
in which the fourth lens group includes, in order from the object side, a first sub-lens group that has a positive refractive power, a second sub-lens group that has a negative refractive power, and a third sub-lens group,
in which during zooming from a wide-angle end to a telephoto end, the first lens group, the first sub-lens group, and the third sub-lens group are stationary in a direction of an optical axis relative to the image plane, the second lens group and the third lens group move in the direction of the optical axis, and the second sub-lens group moves in the direction of the optical axis so as to decrease spacing between the first sub-lens group and the second sub-lens group, and
in which during focusing from an infinite-distance object to a close-range object, the second sub-lens group moves in the direction of the optical axis.

[2]

The zoom lens according to [1], in which the following conditional expression is satisfied.

$$0.5 < OL4/F4T < 1.1 \qquad (1),$$

where
OL4 is a distance on the optical axis from a vertex of a lens surface of the fourth lens group, which is positioned to be closest to an object side, to the image plane, and
F4T is a focal length of the fourth lens group at the telephoto end.

[3]

The zoom lens according to [1] or [2], in which the following conditional expression is satisfied.

$$1.0 < F4W/FW < 3.0 \qquad (2)$$

where
F4W is a focal length of the fourth lens group at the wide-angle end, and
FW is a focal length of the whole system at the wide-angle end.

[4]

The zoom lens according to any one of [1] to [3], in which the following conditional expression is satisfied.

$$1.0 < F4T/F4W < 1.4 \qquad (3)$$

[5]

The zoom lens according to any one of [1] to [4], in which the following conditional expression is satisfied.

$$0.35 < F41/F4T < 0.6 \qquad (4),$$

where
F41 is a focal length of the first sub-lens group, and
F4T is a focal length of the fourth lens group at the telephoto end.

[6]

The zoom lens according to any one of [1] to [5], in which the first sub-lens group includes, in order from the object side, a first positive lens, a cemented lens that has a second positive lens and a negative lens, and a third positive lens.

[7]

The zoom lens according to any one of [1] to [5],
in which the first sub-lens group includes a plurality of lenses and an aperture diaphragm, and
in which the aperture diaphragm is disposed between two lenses adjacent to each other among the plurality of lenses.

[8]

The zoom lens according to any one of [1] to [7], in which the second sub-lens group includes a single positive lens and a single negative lens.

[9]
The zoom lens according to any one of [1] to [8], in which the second sub-lens group is formed of a cemented lens of a single positive lens and a single negative lens.

[10]
The zoom lens according to any one of [1] to [9], in which the following conditional expression is satisfied.

$$0.8 < F43/F4W < 3.0 \quad (5),$$

where
F43 is a focal length of the third sub-lens group.

[11]
The zoom lens according to any one of [1] to [10], in which the third sub-lens group includes an image blur correction lens group which has a positive refractive power and is positioned to be closest to the object side so as to correct image blur which is caused when an optical system moves in a direction perpendicular to the optical axis and thereby vibrates.

[12]
The zoom lens according to any one of [1] to [11], in which the following conditional expression is satisfied.

$$0.9 < F1/F3 < 1.8 \quad (6)$$

where
F1 is a focal length of the first lens group, and
F3 is a focal length of the third lens group.

[13]
The zoom lens according to any one of [1] to [12], in which each of the first lens group, the second lens group, and the third lens group has a cemented lens.

[14]
The zoom lens according to any one of [1] to [13],
in which the first lens group includes two positive lenses, and
in which the following conditional expression is satisfied.

$$80 < vd1 < 110 \quad (7)$$

where
vd1 is a maximum value of an Abbe number of the positive lenses constituting the first lens group.

[15]
The zoom lens according to any one of [1] to [14], in which at least one sub-lens group among the first sub-lens group, the second sub-lens group, and the third sub-lens group has an aspheric surface.

[16]
The zoom lens according to any one of [1] to [15], in which during zooming from the wide-angle end to the telephoto end, the second lens group and the third lens group move to increase spacing between the first lens group and the second lens group, to decrease spacing between the second lens group and the third lens group, and to change spacing between the third lens group and the fourth lens group.

[17]
The zoom lens according to any one of [1] to [16], further including a lens that has substantially no refractive power.

[18]
An optical apparatus including
a zoom lens,
in which the zoom lens includes, in order from an object side,
a first lens group that has a positive refractive power,
a second lens group that has a negative refractive power,
a third lens group that has a positive refractive power, and
a fourth lens group that has a positive refractive power,
in which the fourth lens group includes, in order from the object side, a first sub-lens group that has a positive refractive power, a second sub-lens group that has a negative refractive power, and a third sub-lens group,
in which during zooming from a wide-angle end to a telephoto end, the first lens group, the first sub-lens group, and the third sub-lens group are stationary in a direction of an optical axis relative to the image plane, the second lens group and the third lens group move in the direction of the optical axis, and the second sub-lens group moves in the direction of the optical axis so as to decrease spacing between the first sub-lens group and the second sub-lens group, and
in which during focusing from an infinite-distance object to a close-range object, the second sub-lens group moves in the direction of the optical axis.

[19]
The optical apparatus according to [18], further including an imaging device that outputs an imaging signal based on an optical image, which is formed by the zoom lens, so as to be formed as an imaging apparatus.

[20]
The optical apparatus according to [18] or [19], in which the zoom lens further includes a lens that has substantially no refractive power.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising, in order from an object side:
a first lens group that has a positive refractive power;
a second lens group that has a negative refractive power;
a third lens group that has a positive refractive power; and
a fourth lens group that has a positive refractive power,
wherein the fourth lens group includes, in order from the object side, a first sub-lens group that has a positive refractive power, a second sub-lens group that has a negative refractive power, and a third sub-lens group,
wherein during zooming from a wide-angle end to a telephoto end, the first lens group, the first sub-lens group, and the third sub-lens group are stationary in a direction of an optical axis relative to the image plane, the second lens group and the third lens group move in the direction of the optical axis, and the second sub-lens group moves in the direction of the optical axis so as to decrease spacing between the first sub-lens group and the second sub-lens group, and
wherein during focusing from an infinite-distance object to a close-range object, the second sub-lens group moves in the direction of the optical axis.

2. The zoom lens according to claim 1, wherein the following conditional expression is satisfied:

$$0.5 < OL4/F4T < 1.1 \quad (1),$$

where
is a distance on the optical axis from a vertex of a lens surface of the fourth lens group, which is positioned to be closest to an object side, to the image plane, and
F4T is a focal length of the fourth lens group at the telephoto end.

3. The zoom lens according to claim 1, wherein the following conditional expression is satisfied:

$$1.0 < F4W/FW < 3.0 \quad (2)$$

where
is a focal length of the fourth lens group at the wide-angle end, and
FW is a focal length of the whole system at the wide-angle end.

4. The zoom lens according to claim 1, wherein the following conditional expression is satisfied:

$$1.0 < F4W/FW < 3.0 \quad (2)$$

where
F4W is a focal length of the fourth lens group at the wide-angle end, and
FW is a focal length of the whole system at the wide-angle end.

5. The zoom lens according to claim 1, wherein the following conditional expression is satisfied:

$$0.35 < F41/F4T < 0.6 \quad (4),$$

where
F41 is a focal length of the first sub-lens group, and
F4T is a focal length of the fourth lens group at the telephoto end.

6. The zoom lens according to claim 1, wherein the first sub-lens group includes, in order from the object side, a first positive lens, a cemented lens that has a second positive lens and a negative lens, and a third positive lens.

7. The zoom lens according to claim 1,
wherein the first sub-lens group includes a plurality of lenses and an aperture diaphragm, and
wherein the aperture diaphragm is disposed between two lenses adjacent to each other among the plurality of lenses.

8. The zoom lens according to claim 1, wherein the second sub-lens group includes a single positive lens and a single negative lens.

9. The zoom lens according to claim 1, wherein the second sub-lens group is formed of a cemented lens of a single positive lens and a single negative lens.

10. The zoom lens according to claim 1, wherein the following conditional expression is satisfied:

$$0.8 < F43 < F4W < 3.0 \quad (5),$$

where
F43 is a focal length of the third sub-lens group.

11. The zoom lens according to claim 1, wherein the third sub-lens group includes an image blur correction lens group which has a positive refractive power and is positioned to be closest to the object side so as to correct image blur which is caused when an optical system moves in a direction perpendicular to the optical axis and thereby vibrates.

12. The zoom lens according to claim 1, wherein the following conditional expression is satisfied:

$$0.9 < F1/F3 < 1.8 \quad (6)$$

where
F1 is a focal length of the first lens group, and F3 is a focal length of the third lens group.

13. The zoom lens according to claim 1, wherein each of the first lens group, the second lens group, and the third lens group has a cemented lens.

14. The zoom lens according to claim 1,
wherein the first lens group includes two positive lenses, and
wherein the following conditional expression is satisfied:

$$80 < vd1 < 110 \quad (7)$$

where
vd1 is a maximum value of an Abbe number of the positive lenses constituting the first lens group.

15. The zoom lens according to claim 1, wherein at least one sub-lens group among the first sub-lens group, the second sub-lens group, and the third sub-lens group has an aspheric surface.

16. The zoom lens according to claim 1, wherein during zooming from the wide-angle end to the telephoto end, the second lens group and the third lens group move to increase spacing between the first lens group and the second lens group, to decrease spacing between the second lens group and the third lens group, and to change spacing between the third lens group and the fourth lens group.

17. An optical apparatus comprising
a zoom lens,
wherein the zoom lens includes, in order from an object side,
a first lens group that has a positive refractive power,
a second lens group that has a negative refractive power,
a third lens group that has a positive refractive power, and
a fourth lens group that has a positive refractive power,
wherein the fourth lens group includes, in order from the object side, a first sub-lens group that has a positive refractive power, a second sub-lens group that has a negative refractive power, and a third sub-lens group,
wherein during zooming from a wide-angle end to a telephoto end, the first lens group, the first sub-lens group, and the third sub-lens group are stationary in a direction of an optical axis relative to the image plane, the second lens group and the third lens group move in the direction of the optical axis, and the second sub-lens group moves in the direction of the optical axis so as to decrease spacing between the first sub-lens group and the second sub-lens group, and
wherein during focusing from an infinite-distance object to a close-range object, the second sub-lens group moves in the direction of the optical axis.

18. The optical apparatus according to claim 17, further comprising an imaging device that outputs an imaging signal based on an optical image, which is formed by the zoom lens, so as to be formed as an imaging apparatus.

* * * * *